(12) United States Patent
Conner et al.

(10) Patent No.: US 12,497,632 B2
(45) Date of Patent: Dec. 16, 2025

(54) CLINICAL PARAMETERS BY EXPRESSION OF FACTOR VIII

(71) Applicant: Sangamo Therapeutics, Inc., Richmond, CA (US)

(72) Inventors: Edward R. Conner, Brisbane, CA (US); Brigit E. Riley, Brisbane, CA (US); Didier Rouy, Brisbane, CA (US)

(73) Assignee: Sangamo Therapeutics, Inc., Richmond, CA (US)

( * ) Notice: Subject to any disclaimer, the term of this patent is extended or adjusted under 35 U.S.C. 154(b) by 828 days.

(21) Appl. No.: 17/265,750

(22) PCT Filed: Aug. 2, 2019

(86) PCT No.: PCT/US2019/044946
§ 371 (c)(1),
(2) Date: Feb. 3, 2021

(87) PCT Pub. No.: WO2020/028830
PCT Pub. Date: Feb. 6, 2020

(65) Prior Publication Data
US 2021/0171982 A1    Jun. 10, 2021

Related U.S. Application Data

(60) Provisional application No. 62/869,445, filed on Jul. 1, 2019, provisional application No. 62/826,887, filed (Continued)

(51) Int. Cl.
*C12N 15/86* (2006.01)
*A61K 38/37* (2006.01)
(Continued)

(52) U.S. Cl.
CPC .............. *C12N 15/86* (2013.01); *A61K 38/37* (2013.01); *A61P 7/04* (2018.01); *C12N 7/00* (2013.01);
(Continued)

(58) Field of Classification Search
CPC combination set(s) only.
See application file for complete search history.

(56) References Cited

U.S. PATENT DOCUMENTS 6,200,560 B1   3/2001  Couto et al.
6,936,243 B2   8/2005  Snyder et al.
(Continued)

FOREIGN PATENT DOCUMENTS

CN    103917644 A    7/2014
CN    106456718 A    2/2017
(Continued)

OTHER PUBLICATIONS

George. Hemophilia gene therapy comes of age. Hematology Am Soc Hematol Educ Program. Dec. 8, 2017;2017(1):587-594. (Year: 2017).*
(Continued)

*Primary Examiner* — Peter Paras, Jr.
*Assistant Examiner* — Briana N Ebbinghaus
(74) *Attorney, Agent, or Firm* — ROTHWELL, FIGG, ERNST & MANBECK, P.C.

(57) ABSTRACT

Described herein are constructs used for liver-specific expression of a transgene.

19 Claims, 10 Drawing Sheets

Specification includes a Sequence Listing.

Related U.S. Application Data on Mar. 29, 2019, provisional application No. 62/714,553, filed on Aug. 3, 2018.

(51) Int. Cl.
  *A61K 48/00* (2006.01)
  *A61P 7/04* (2006.01)
  *C12N 7/00* (2006.01)

(52) U.S. Cl.
  CPC .... *A61K 48/00* (2013.01); *C12N 2750/14043* (2013.01); *C12N 2750/14071* (2013.01)

(56) References Cited

U.S. PATENT DOCUMENTS

| | | | |
|---|---|---|---|
| 7,238,346 | B2 | 7/2007 | Vandendriessche et al. |
| 9,072,722 | B2 | 7/2015 | Fay et al. |
| 9,150,847 | B2 | 10/2015 | Rebar |
| 10,058,624 | B2 | 8/2018 | Doering et al. |
| 10,308,705 | B2 | 6/2019 | Xiao et al. |
| 10,450,585 | B2 | 10/2019 | Lee et al. |
| 10,828,376 | B2 | 11/2020 | Riley et al. |
| 10,912,301 | B2 | 2/2021 | Oeser et al. |
| 10,975,375 | B2* | 4/2021 | Rebar ........................ A61P 3/00 |
| 11,192,936 | B2 | 12/2021 | Chhabra et al. |
| 11,452,782 | B2* | 9/2022 | Riley ..................... A61K 45/06 |
| 2005/0276787 | A1 | 12/2005 | Couto et al. |
| 2008/0019946 | A1 | 1/2008 | Nenoi et al. |
| 2011/0184049 | A1 | 7/2011 | Chuah et al. |
| 2013/0177983 | A1 | 7/2013 | Rebar |
| 2013/0237594 | A1* | 9/2013 | de Fougerolles .. A61K 48/0033 514/44 R |
| 2014/0017212 | A1 | 1/2014 | Rebar |
| 2015/0071883 | A1 | 3/2015 | Colosi |
| 2017/0119906 | A1* | 5/2017 | Riley ................... C12N 15/907 |
| 2017/0233455 | A1* | 8/2017 | Falkner .............. A61K 48/0008 424/93.2 |
| 2020/0102577 | A1 | 4/2020 | Lee et al. |
| 2020/0237930 | A1* | 7/2020 | Anguela ................ A61K 38/37 |
| 2023/0119850 | A1 | 4/2023 | Riley et al. |

FOREIGN PATENT DOCUMENTS

| | | | |
|---|---|---|---|
| CN | 107531774 | A | 1/2018 |
| CN | 108093639 | A | 5/2018 |
| EP | 2451474 | B1 | 12/2013 |
| WO | WO 2005040384 | A1 | 5/2005 |
| WO | WO 2007021353 | A2 | 2/2007 |
| WO | WO 2009130208 | A1 | 10/2009 |
| WO | WO-2009134681 | A2 * | 11/2009 ......... A61K 48/0058 |
| WO | 2011005968 | A1 | 1/2011 |
| WO | WO 2013106787 | A1 | 7/2013 |
| WO | WO 2014043131 | A1 | 3/2014 |
| WO | WO 2014064277 | A1 | 5/2014 |
| WO | WO 2014162318 | A2 | 10/2014 |
| WO | WO 2015089046 | A1 | 6/2015 |
| WO | WO 2015089077 | A2 | 6/2015 |
| WO | WO 2017011519 | A1 | 1/2017 |
| WO | WO 2017053677 | A1 | 3/2017 |
| WO | WO 2017074526 | A1 | 5/2017 |

OTHER PUBLICATIONS

Leebeek et al. Interim Results from a Dose Escalating Study of AMT-060 (AAV5-hFIX) Gene Transfer in Adult Patients with Severe Hemophilia B. Blood (2016) 128 (22) : 2314. (Year: 2016).*
Rangarajan et al. AAV5-Factor VIII Gene Transfer in Severe Hemophilia A. N Engl J Med . Dec. 28, 2017;377(26):2519-2530. Epub Dec. 9, 2017. (Year: 2017).*
Favaro et al. Safety of Liver Gene Transfer Following Peripheral Intravascular Delivery of Adeno-Associated Virus (AAV)-5 and AAV-6 in a Large Animal Model. Hum Gene Ther. Jul. 2011;22(7):843-52. Epub Mar. 8, 2011. (Year: 2011).*
Chuah et al., "Liver-Specific Transcriptional Modules Identified by Genome-Wide In Silico Analysis Enable Efficient Gene Therapy in Mice and Non-Human Primates," Molecular Therapy (2014), vol. 22(9), pp. 1605-1613.
Nair et al., "Computationally designed liver-specific transcriptional modules and hyperactive factor IX improve hepatic gene therapy," Blood (2014), vol. 123(20), pp. 3195-3199.
Haut et al., "Intron Definition Is Required for Excision of the Minute Virus of Mice Small Intron and Definition of the Upstream Exon," Journal of Virol. (1998), vol. 72(3), pp. 1834-1843.
Haut et al., "Inclusion of the NS2-Specific Exon in Minute Virus of Mice mRNA Is Facilitated by an Intronic Splicing Enhancer That Affects Definition of the Downstream Small Intron," Virol. (1999), vol. 258(1), pp. 84-94.
Kulkarni et al., "Sites of initial bleeding episodes, mode of delivery and age of diagnosis in babies with haemophilia diagnosed before the age of 2 years: a report from the Centers for Disease Control and Prevention's (CDC) Universal Data Collection (UDC) project," Haemophilia (2009), vol. 15(6), pp. 1281-1290.
Shi et al., "Lentivirus-mediated platelet-derived factor VIII gene therapy in murine haemophilia A," Journal of Thromb. and Haemost. (2007), vol. 5(2), pp. 352-361.
Lee et al., "A New Potent hFIX Plasmid for Hemophilia B Gene Therapy," Pharm. Res. (2004), vol. 21(7), pp. 1229-1232.
Graham et al., "Performance of AAV8 vectors expressing human factor IX from a hepatic-selective promoter following intravenous injection into rats," Genet Vaccines Ther. (2008), vol. 6(9), 5 pages.
Manno et al., "AAV-mediated factor IX gene transfer to skeletal muscle in patients with severe hemophilia B," Blood (2003), vol. 101(8), pp. 2963-2972.
Manno et al., "Successful transduction of liver in hemophilia by AAV-Factor IX and limitations imposed by the host immune response," NatureMedicine (2006), vol. 12(3), pp. 342-347.
Nathwani et al., "Long-term Safety and Efficacy Following Systemic Administration of a Self-complementary AAV Vector Encoding Human FIX Pseudotyped With Serotype 5 and 8 Capsid Proteins," Mol. Ther. (2011), vol. 19(5), pp. 876-885.
Nathwani et al., "Adenovirus-associated virus vector-mediated gene transfer in hemophilia B," N Engl J Med. (2011), vol. 365(25), pp. 2357-2365.
Mcintosh et al., "Therapeutic levels of FVIII following a single peripheral vein administration of rAAV vector encoding a novel human factor VIII variant," Blood (2013), 121(17), pp. 3335-3344.
Wu, et al., "Optimization of Self-complementary AAV Vectors for Liver-directed Expression Results in Sustained Correction of Hemophilia B at Low Vector Dose," Molecular Therapy (2008), vol. 16(2), pp. 280-289.
Brown et al., "Bioengineered coagulation factor VIII enables long-term correction of murine hemophilia A following liver-directed adeno-associated viral vector delivery," Molecular Therapy—Methods & Clinical Development (2014) 1:14036, pp. 1-10.
Arruda et al., "Strategies to Modulate Immune Responses: A New Frontier for Gene Therapy," Molecular Therapy (2009), vol. 17(9), pp. 1492-1503.
Ozawa, "Gene therapy using AAV vectors," Drug Delivery System (2007), vol. 22(6), pp. 643-650.
Mizukami, "Gene transfer method using AAV vectors," Japanese Journal of Thrombosis and Hemostasis (2008), vol. 19(2), pp. 265-270.
Bril et al., "Tolerance to factor VIII in a transgenic mouse expressing human factor VIII cDNA carrying an Arg$^{593}$ to Cys substitution," Thromb Haemost (2006), vol. 95(2), pp. 341-347.
Chavez et al., "Long-Term Expression of Human Coagulation Factor VIII in a Tolerant Mouse Model Using the φ31 Integrase System," Human Gene Therapy (2012), vol. 23, pp. 390-398.
Costa et al., "Site-directed mutagenesis of hepatocyte nuclear factor (HNF) binding sites in the mouse transthyretin (TTR) promoter reveal synergistic interactions with its enhancer region," Nucleic Acids Research (1991), vol. 19, No. 15, pp. 4139-4145.
Donald et al., "Mutation of either G box or I box sequences profoundly affects expression from the *Arabidopsis* rbcS-1A promoter," The EMBO Journal (1990), vol. 9 No. 6, pp. 1717-1726.

(56) References Cited

OTHER PUBLICATIONS

Fagerlund et al., "The Cpf1 CRISPR-Cas protein expands genome-editing tools," Genome Biology (2015), vol. 16:251, 3 pages.
Gaj et al., "ZFN, TALEN, and CRISPR/Cas-based methods for genome engineering," Trends in Biotechnology (2013), vol. 37, No. 7, pp. 397-405.
Guilinger et al., "Fusion of catalytically inactive Cas9 to FokI nuclease improves the specificity of genome modification," Nature Biotechnology (2014), vol. 32 No. 6, pp. 577-583.
Ha et al., "Cis-acting regulatory elements controlling temporal and organ-specific activity of nopaline synthase promoter," Nucleic Acids Research (1989), vol. 17 no., pp. 215-223.
Johansen et al., "Development of a tail vein transection bleeding model in fully anaesthetized haemophilia A mice—characterization of two novel FVIII molecules," Haemophilia (2016), vol. 22(4), pp. 625-631.
Kim et al., "A 20 nucleotide upstream element is essential for the nopaline synthase (nos) promoter activity," Plant Molecular Biology (1994), vol. 24, pp. 105-117.
Levinson et al., "A Transcribed Gene in an Intron of the Human Factor VIII Gene," Genomics (1990), vol. 7(1), pp. 1-11.
Li et al., "Human Enhancers Are Fragile and Prone to Deactivating Mutations," Mol. Biol. Evol. (2015), vol. 32(8), pp. 2161-2180.
Ljung, "Prophylactic Infusion Regimens in the Management of Hemophilia," Thrombosis and Haemostasis (1999), vol. 82(2), pp. 525-530.
McCaffrey et al., CRISPR-CAS9 D10A nickase target-specific fluorescent labeling of double strand DNA for whole genome mapping and structural variation analysis, Nucleic Acids Research (2016), vol. 44, No. 2, 8 pages.
Niu et al., "Applications of TALENs and CRISPR/Cas9 in Human Cells and Their Potentials for Gene Therapy," Mol. Biotechnol. (2014), vol. 56, pp. 681-688.
Osorio et al., "Role of dendritic cells in the induction of lymphocyte tolerance," Front. Immunol. (2015), vol. 6, article 535, 11 pages.
Raker et al., "Tolerogenic Dendritic Cells for Regulatory T Cell Induction in Man," Front. Immunol., (2015), vol. 6, article 569, 11 pages.
Scott et al., "Gene therapy for haemophilia: prospects and challenges to prevent or reverse inhibitor formation," British Journal of Haematology (2011), vol. 156(3), pp. 295-302.
Wang et al., "Hepatocyte nuclear factor-4α interacts with other hepatocyte nuclear factors in regulating transthyretin gene expression," Fees J. (2010), vol. 277(19), pp. 4066-4075.
Jiang et al., "Multiyear therapeutic benefit of AAV serotypes 2, 6, and 8 delivering factor VIII to hemophilia A mice and dogs," 2006, Blood, 108 (1): 107-115, https://doi.org/10.11.
Office Action issued for the Chinese Patent Application No. 201980051349.9 issued on May 31, 2024, 17 pages.
Examination Report and Search Report issued for the United Arab Emirates patent Application No. P600121/2021 dated Sep. 6, 2024, 8 pages.
Au et al. (2022) "Gene Therapy Advances: A Meta-Analysis of AAV Usage in Clinical Settings" Front. Med. 8:809118 doi: 10.3389/fmed.2021.809118, 14 pages.
Issa et al. (2023) "Various AAV Serotypes and Their Applications in Gene Therapy: An Overview" Cells 12:785 https://doi.org/10.3390/cells12050785, 41 pages.
Substantive Examination Report issued for Saudi Arabian Patent Application No. 521421111 on Aug. 19, 2025, 10 pages.

* cited by examiner

Factor VIII Replacement usage reduction

| Dose Cohort (dose vg/kg) | Subject | Follow-Up (Weeks) | Factor VIII Infusion Prior Dosing | Number of Factor VIII Infusions ≥ 3 weeks Post Treatment |
|---|---|---|---|---|
| 1 (9e11) | 1 | 93 | 2 Times Per Week | 115 |
| 1 (9e11) | 2 | 83 | 2 Times Per Week | 26 |
| 2 (2e12) | 3 | 73 | 2 Times Per Week | 13 |
| 2 (2e12) | 4 | 66 | 3 Times Per Week | 9 |
| 3 (1e13) | 5 | 50 | Every Other Day | 11 |
| 3 (1e13) | 6 | 40 | Every Other Day | 0 |
| 4 (3e13) | 7 | 14 | Every 4 Days | 0 |
| 4 (3e13) | 8 | 18 | Every Other Day | 0 |
| 4 (3e13) | 9 | 5 | Every 3 Days | 1* |
| 4 (3e13) | 10 | 5 | Every 3 Days | - |

FIG. 7

Serious Adverse Event (SAE) Summary

- Two subjects reported serious adverse events (SAEs); assessed as treatment-related in one subject

- SAEs of hypotension (grade 3) and fever (grade 2) in one subject, with symptoms of headache and tachycardia, occurred 6 hours after end of SB-525 infusion and resolved with treatment within 24 hours o Based on the temporal association, this was assessed as related to the study treatment; subject's hydration status considered a possible contributing factor.

o In response, guidelines communicated to sites for maintaining hydration level and event management recommendations o No similar high grade events observed in the subsequent 3 subjects dosed

- SAE of cellulitis (grade 3) requiring hospitalization occurred approximately one year after study drug infusion

- Based on the subject's recurrent history of pilonidal cyst, this was assessed as unrelated to the study treatment.

FIG. 8

Treatment-Related Adverse Event (AE) Summary

| MedDRA Preferred Term | Cohort 1 9e11 vg/kg (N=2) n(%)[T] | Cohort 2 2e12 vg/kg (N=2) n(%)[T] | Cohort 3 1e13 vg/kg (N=2) n(%)[T] | Cohort 4 3e13 vg/kg (N=4) n(%)[T] | Overall (N=10) n(%)[T] |
|---|---|---|---|---|---|
| Any Treatment-Related Event | 0 (0.0) [0] | 2 (100) [4] | 0 (0.0) [0] | 3 (75.0) [8] | 5 (50.0) [12] |
| Alanine aminotransferase increased | 0 (0.0) [0] | 2 (100) [5] | 0 (0.0) [0] | 1 (25.0) [1] | 3 (75.0) [4] |
| Pyrexia | 0 (0.0) [0] | 0 (0.0) [0] | 0 (0.0) [0] | 3 (75.0) [3]* | 3 (75.0) [3] |
| Aspartate aminotransferase increased | 0 (0.0) [0] | 1 (50.0) [1] | 0 (0.0) [0] | 0 (0.0) [0] | 1 (10.0) [1] |
| Fatigue | 0 (0.0) [0] | 0 (0.0) [0] | 0 (0.0) [0] | 1 (25.0) [1] | 1 (10.0) [1] |
| Hypotension | 0 (0.0) [0] | 0 (0.0) [0] | 0 (0.0) [0] | 1 (25.0) [1]** | 1 (10.0) [1] |
| Myalgia | 0 (0.0) [0] | 0 (0.0) [0] | 0 (0.0) [0] | 1 (25.0) [1] | 1 (10.0) [1] |
| Tachycardia | 0 (0.0) [0] | 0 (0.0) [0] | 0 (0.0) [0] | 1 (25.0) [1] | 1 (10.0) [1] |

N= Total number of subjects in each treatment group, n= number of subjects in each SOC, [T]= total number of adverse events.
*Grade 2 event reported, **Grade 3 event reported

FIG. 9

Summary of Results

- SB-525 was administered to 10 subjects with severe hemophilia A at a dose ranging from 9e11 vg/kg to 3e13 vg/kg and was generally well-tolerated

- One subject reported a treatment-related serious adverse event of hypotension and fever, with symptoms of headache and tachycardia, which occurred after the vector infusion and resolved with treatment within 24 hours

- No transaminitis longer than 7 days was observed in the first three cohorts

- Increases in Factor VIII activity were observed in subjects at both the 1e13 and 3e13 vg/kg dose

- Patients continued prophylactic coverage per protocol o Upon discontinuation of prophylactic coverage, no further Factor VIII replacement usage was required

- Following administration of SB-525, one patient in the cohort 3 and all patients in the high dose cohort have had no bleeding episodes since the vector injection

FIG. 10

SEQUENCE LISTING

```
<160> NUMBER OF SEQ ID NOS: 14

<210> SEQ ID NO 1
<211> LENGTH: 1457
<212> TYPE: PRT
<213> ORGANISM: Homo sapiens

<400> SEQUENCE: 1

Met Gln Ile Glu Leu Ser Thr Cys Phe Phe Leu Cys Leu Leu Arg Phe
1               5                   10                  15

Cys Phe Ser Ala Thr Arg Arg Tyr Tyr Leu Gly Ala Val Glu Leu Ser
            20                  25                  30

Trp Asp Tyr Met Gln Ser Asp Leu Gly Glu Leu Pro Val Asp Ala Arg
        35                  40                  45

Phe Pro Pro Arg Val Pro Lys Ser Phe Pro Phe Asn Thr Ser Val Val
    50                  55                  60

Tyr Lys Lys Thr Leu Phe Val Glu Phe Thr Asp His Leu Phe Asn Ile
65                  70                  75                  80

Ala Lys Pro Arg Pro Pro Trp Met Gly Leu Leu Gly Pro Thr Ile Gln
                85                  90                  95

Ala Glu Val Tyr Asp Thr Val Val Ile Thr Leu Lys Asn Met Ala Ser
            100                 105                 110

His Pro Val Ser Leu His Ala Val Gly Val Ser Tyr Trp Lys Ala Ser
        115                 120                 125

Glu Gly Ala Glu Tyr Asp Asp Gln Thr Ser Gln Arg Glu Lys Glu Asp
    130                 135                 140

Asp Lys Val Phe Pro Gly Gly Ser His Thr Tyr Val Trp Gln Val Leu
145                 150                 155                 160

Lys Glu Asn Gly Pro Met Ala Ser Asp Pro Leu Cys Leu Thr Tyr Ser
                165                 170                 175

Tyr Leu Ser His Val Asp Leu Val Lys Asp Leu Asn Ser Gly Leu Ile
            180                 185                 190
```

```
Gly Ala Leu Leu Val Cys Arg Glu Gly Ser Leu Ala Lys Glu Lys Thr
            195                 200                 205

Gln Thr Leu His Lys Phe Ile Leu Leu Phe Ala Val Phe Asp Glu Gly
        210                 215                 220

Lys Ser Trp His Ser Glu Thr Lys Asn Ser Leu Met Gln Asp Arg Asp
225                 230                 235                 240

Ala Ala Ser Ala Arg Ala Trp Pro Lys Met His Thr Val Asn Gly Tyr
                245                 250                 255

Val Asn Arg Ser Leu Pro Gly Leu Ile Gly Cys His Arg Lys Ser Val
            260                 265                 270

Tyr Trp His Val Ile Gly Met Gly Thr Thr Pro Glu Val His Ser Ile
        275                 280                 285

Phe Leu Glu Gly His Thr Phe Leu Val Arg Asn His Arg Gln Ala Ser
        290                 295                 300

Leu Glu Ile Ser Pro Ile Thr Phe Leu Thr Ala Gln Thr Leu Leu Met
305                 310                 315                 320

Asp Leu Gly Gln Phe Leu Leu Phe Cys His Ile Ser Ser His Gln His
                325                 330                 335

Asp Gly Met Glu Ala Tyr Val Lys Val Asp Ser Cys Pro Glu Glu Pro
            340                 345                 350

Gln Leu Arg Met Lys Asn Asn Glu Glu Ala Glu Asp Tyr Asp Asp Asp
        355                 360                 365

Leu Thr Asp Ser Glu Met Asp Val Val Arg Phe Asp Asp Asp Asn Ser
    370                 375                 380

Pro Ser Phe Ile Gln Ile Arg Ser Val Ala Lys Lys His Pro Lys Thr
385                 390                 395                 400

Trp Val His Tyr Ile Ala Ala Glu Glu Glu Asp Trp Asp Tyr Ala Pro
                405                 410                 415

Leu Val Leu Ala Pro Asp Asp Arg Ser Tyr Lys Ser Gln Tyr Leu Asn
            420                 425                 430

Asn Gly Pro Gln Arg Ile Gly Arg Lys Tyr Lys Lys Val Arg Phe Met
        435                 440                 445

Ala Tyr Thr Asp Glu Thr Phe Lys Thr Arg Glu Ala Ile Gln His Glu
        450                 455                 460

Ser Gly Ile Leu Gly Pro Leu Leu Tyr Gly Glu Val Gly Asp Thr Leu
465                 470                 475                 480

Leu Ile Ile Phe Lys Asn Gln Ala Ser Arg Pro Tyr Asn Ile Tyr Pro
                485                 490                 495

His Gly Ile Thr Asp Val Arg Pro Leu Tyr Ser Arg Arg Leu Pro Lys
            500                 505                 510

Gly Val Lys His Leu Lys Asp Phe Pro Ile Leu Pro Gly Glu Ile Phe
        515                 520                 525

Lys Tyr Lys Trp Thr Val Thr Val Glu Asp Gly Pro Thr Lys Ser Asp
    530                 535                 540

Pro Arg Cys Leu Thr Arg Tyr Tyr Ser Ser Phe Val Asn Met Glu Arg
545                 550                 555                 560

Asp Leu Ala Ser Gly Leu Ile Gly Pro Leu Leu Ile Cys Tyr Lys Glu
                565                 570                 575

Ser Val Asp Gln Arg Gly Asn Gln Ile Met Ser Asp Lys Arg Asn Val
            580                 585                 590

Ile Leu Phe Ser Val Phe Asp Glu Asn Arg Ser Trp Tyr Leu Thr Glu
        595                 600                 605
```

-continued

```
Asn Ile Gln Arg Phe Leu Pro Asn Pro Ala Gly Val Gln Leu Glu Asp
    610                 615                 620
Pro Glu Phe Gln Ala Ser Asn Ile Met His Ser Ile Asn Gly Tyr Val
625                 630                 635                 640
Phe Asp Ser Leu Gln Leu Ser Val Cys Leu His Glu Val Ala Tyr Trp
                645                 650                 655
Tyr Ile Leu Ser Ile Gly Ala Gln Thr Asp Phe Leu Ser Val Phe Phe
            660                 665                 670
Ser Gly Tyr Thr Phe Lys His Lys Met Val Tyr Glu Asp Thr Leu Thr
        675                 680                 685
Leu Phe Pro Phe Ser Gly Glu Thr Val Phe Met Ser Met Glu Asn Pro
    690                 695                 700
Gly Leu Trp Ile Leu Gly Cys His Asn Ser Asp Phe Arg Asn Arg Gly
705                 710                 715                 720
Met Thr Ala Leu Leu Lys Val Ser Ser Cys Asp Lys Asn Thr Gly Asp
                725                 730                 735
Tyr Tyr Glu Asp Ser Tyr Glu Asp Ile Ser Ala Tyr Leu Leu Ser Lys
            740                 745                 750
Asn Asn Ala Ile Glu Pro Arg Ser Phe Ser Gln Asn Pro Pro Val Leu
        755                 760                 765
Lys Arg His Gln Arg Glu Ile Thr Arg Thr Thr Leu Gln Ser Asp Gln
    770                 775                 780
Glu Glu Ile Asp Tyr Asp Asp Thr Ile Ser Val Glu Met Lys Lys Glu
785                 790                 795                 800
Asp Phe Asp Ile Tyr Asp Glu Asp Glu Asn Gln Ser Pro Arg Ser Phe
                805                 810                 815
Gln Lys Lys Thr Arg His Tyr Phe Ile Ala Ala Val Glu Arg Leu Trp
            820                 825                 830
Asp Tyr Gly Met Ser Ser Ser Pro His Val Leu Arg Asn Arg Ala Gln
        835                 840                 845
Ser Gly Ser Val Pro Gln Phe Lys Lys Val Val Phe Gln Glu Phe Thr
    850                 855                 860
Asp Gly Ser Phe Thr Gln Pro Leu Tyr Arg Gly Glu Leu Asn Glu His
865                 870                 875                 880
Leu Gly Leu Leu Gly Pro Tyr Ile Arg Ala Glu Val Glu Asp Asn Ile
                885                 890                 895
Met Val Thr Phe Arg Asn Gln Ala Ser Arg Pro Tyr Ser Phe Tyr Ser
            900                 905                 910
Ser Leu Ile Ser Tyr Glu Glu Asp Gln Arg Gln Gly Ala Glu Pro Arg
        915                 920                 925
Lys Asn Phe Val Lys Pro Asn Glu Thr Lys Thr Tyr Phe Trp Lys Val
    930                 935                 940
Gln His His Met Ala Pro Thr Lys Asp Glu Phe Asp Cys Lys Ala Trp
945                 950                 955                 960
Ala Tyr Phe Ser Asp Val Asp Leu Glu Lys Asp Val His Ser Gly Leu
                965                 970                 975
Ile Gly Pro Leu Leu Val Cys His Thr Asn Thr Leu Asn Pro Ala His
            980                 985                 990
Gly Arg Gln Val Thr Val Gln Glu Phe Ala Leu Phe Phe Thr Ile Phe
        995                 1000                1005
Asp Glu Thr Lys Ser Trp Tyr Phe Thr Glu Asn Met Glu Arg Asn
    1010                1015                1020
Cys Arg Ala Pro Cys Asn Ile Gln Met Glu Asp Pro Thr Phe Lys
```

-continued

```
            1025                1030                1035

Glu Asn Tyr Arg Phe His Ala Ile Asn Gly Tyr Ile Met Asp Thr
    1040                1045                1050

Leu Pro Gly Leu Val Met Ala Gln Asp Gln Arg Ile Arg Trp Tyr
    1055                1060                1065

Leu Leu Ser Met Gly Ser Asn Glu Asn Ile His Ser Ile His Phe
    1070                1075                1080

Ser Gly His Val Phe Thr Val Arg Lys Lys Glu Glu Tyr Lys Met
    1085                1090                1095

Ala Leu Tyr Asn Leu Tyr Pro Gly Val Phe Glu Thr Val Glu Met
    1100                1105                1110

Leu Pro Ser Lys Ala Gly Ile Trp Arg Val Glu Cys Leu Ile Gly
    1115                1120                1125

Glu His Leu His Ala Gly Met Ser Thr Leu Phe Leu Val Tyr Ser
    1130                1135                1140

Asn Lys Cys Gln Thr Pro Leu Gly Met Ala Ser Gly His Ile Arg
    1145                1150                1155

Asp Phe Gln Ile Thr Ala Ser Gly Gln Tyr Gly Gln Trp Ala Pro
    1160                1165                1170

Lys Leu Ala Arg Leu His Tyr Ser Gly Ser Ile Asn Ala Trp Ser
    1175                1180                1185

Thr Lys Glu Pro Phe Ser Trp Ile Lys Val Asp Leu Leu Ala Pro
    1190                1195                1200

Met Ile Ile His Gly Ile Lys Thr Gln Gly Ala Arg Gln Lys Phe
    1205                1210                1215

Ser Ser Leu Tyr Ile Ser Gln Phe Ile Ile Met Tyr Ser Leu Asp
    1220                1225                1230

Gly Lys Lys Trp Gln Thr Tyr Arg Gly Asn Ser Thr Gly Thr Leu
    1235                1240                1245

Met Val Phe Phe Gly Asn Val Asp Ser Ser Gly Ile Lys His Asn
    1250                1255                1260

Ile Phe Asn Pro Pro Ile Ile Ala Arg Tyr Ile Arg Leu His Pro
    1265                1270                1275

Thr His Tyr Ser Ile Arg Ser Thr Leu Arg Met Glu Leu Met Gly
    1280                1285                1290

Cys Asp Leu Asn Ser Cys Ser Met Pro Leu Gly Met Glu Ser Lys
    1295                1300                1305

Ala Ile Ser Asp Ala Gln Ile Thr Ala Ser Ser Tyr Phe Thr Asn
    1310                1315                1320

Met Phe Ala Thr Trp Ser Pro Ser Lys Ala Arg Leu His Leu Gln
    1325                1330                1335

Gly Arg Ser Asn Ala Trp Arg Pro Gln Val Asn Asn Pro Lys Glu
    1340                1345                1350

Trp Leu Gln Val Asp Phe Gln Lys Thr Met Lys Val Thr Gly Val
    1355                1360                1365

Thr Thr Gln Gly Val Lys Ser Leu Leu Thr Ser Met Tyr Val Lys
    1370                1375                1380

Glu Phe Leu Ile Ser Ser Ser Gln Asp Gly His Gln Trp Thr Leu
    1385                1390                1395

Phe Phe Gln Asn Gly Lys Val Lys Val Phe Gln Gly Asn Gln Asp
    1400                1405                1410

Ser Phe Thr Pro Val Val Asn Ser Leu Asp Pro Pro Leu Leu Thr
    1415                1420                1425
```

Arg Tyr Leu Arg Ile His Pro Gln Ser Trp Val His Gln Ile Ala
    1430            1435            1440

Leu Arg Met Glu Val Leu Gly Cys Glu Ala Gln Asp Leu Tyr
    1445            1450            1455

<210> SEQ ID NO 2
<211> LENGTH: 84
<212> TYPE: DNA
<213> ORGANISM: Unknown
<220> FEATURE:
<223> OTHER INFORMATION: Description of Unknown:
      SERPIN1 enhancer sequence

<400> SEQUENCE: 2
gggggaggct gctggtgaat attaaccaag atcaccccag ttaccggagg agcaaacagg      60
gactaagttc acacgcgtgg tacc                                            84

<210> SEQ ID NO 3
<211> LENGTH: 223
<212> TYPE: DNA
<213> ORGANISM: Unknown
<220> FEATURE:
<223> OTHER INFORMATION: Description of Unknown:
      TTRm promoter sequence

<400> SEQUENCE: 3
gtctgtctgc acatttcgta gagcgagtgt tccgatactc taatctccct aggcaaggtt     60
catatttgtg taggttactt attctccttt tgttgactaa gtcaataatc agaatcagca   120
ggtttggagt cagcttggca gggatcagca gcctgggttg aaggaggggg gtataaaagc   180
cccttcacca ggagaagccg tcacacagat ccacaagctc ctg                     223

<210> SEQ ID NO 4
<211> LENGTH: 4374
<212> TYPE: DNA
<213> ORGANISM: Unknown
<220> FEATURE:
<223> OTHER INFORMATION: Description of Unknown:
      Coding sequence for FVIII

<400> SEQUENCE: 4
atgcagatcg agctctccac ctgcttcttt ctgtgcctgt tgagattctg cttcagcgcc      60
accaggagat actacctggg ggctgtggag ctgagctggg actacatgca gtctgacctg    120
ggggagctgc ctgtggatgc caggttcccc ccagagtgc caagagctt ccccttcaac      180 acctctgtgg tgtacaagaa gaccctgttt gtggagttca ctgaccacct gttcaacatt    240
gccaagccca ggccccctg gatgggcctg ctgggcccca catccaggc tgaggtgtat      300 gacactgtgg tgatcaccct gaagaacatg gccagccacc ctgtgagcct gcatgctgtg    360
ggggtgagct actggaaggc ctctgagggg gctgagtatg atgaccagac cagccagagg    420
gagaaggagg atgacaaggt gttccctggg gcagccaca cctatgtgtg gcaggtgctg    480
aaggagaatg gccccatggc ctctgacccc ctgtgcctga cctacagcta cctgagccat    540
gtggacctgg tgaaggacct gaactctggc ctgattgggg ccctgctggt gtgcaggag    600 ggcagcctgg ccaaggagaa gacccagacc tgcacaagt tcatcctgct gtttgctgtg    660
tttgatgagg gcaagagctg gcactctgaa accaagaaca gcctgatgca ggacagggat   720
gctgcctctg ccagggcctg gcccaagatg cacactgtga atggctatgt gaacaggagc   780
ctgcctggcc tgattggctg ccacaggaag tctgtgtact ggcatgtgat tggcatgggc   840

```
accacccctg aggtgcacag catcttcctg gagggccaca ccttcctggt caggaaccac    900
aggcaggcca gcctggagat cagccccatc accttcctga ctgcccagac cctgctgatg    960
gacctgggcc agttcctgct gttctgccac atcagcagcc accagcatga tggcatggag   1020
gcctatgtga aggtggacag ctgccctgag gagccccagc tgaggatgaa gaacaatgag   1080
gaggctgagg actatgatga tgacctgact gactctgaga tggatgtggt gaggtttgat   1140
gatgacaaca gccccagctt catccagatc aggtctgtgg ccaagaagca ccccaagacc   1200
tgggtgcact acattgctgc tgaggaggag gactgggact atgcccccct ggtgctggcc   1260
cctgatgaca ggagctacaa gagccagtac ctgaacaatg gcccccagag gattggcagg   1320
aagtacaaga aggtcaggtt catggcctac actgatgaaa ccttcaagac cagggaggcc   1380
atccagcatg agtctggcat cctgggcccc ctgctgtatg gggaggtggg ggacaccctg   1440
ctgatcatct tcaagaacca ggccagcagg ccctacaaca tctaccccca tggcatcact   1500
gatgtgaggc ccctgtacag caggaggctg cccaagggg tgaagcacct gaaggacttc   1560
cccatcctgc ctggggagat cttcaagtac aagtggactg tgactgtgga ggatggcccc   1620
accaagtctg accccaggtg cctgaccaga tactacagca gctttgtgaa catggagagg   1680
gacctggcct ctggcctgat tggccccctg ctgatctgct acaaggagtc tgtggaccag   1740
aggggcaacc agatcatgtc tgacaagagg aatgtgatcc tgttctctgt gtttgatgag   1800
aacaggagct ggtacctgac tgagaacatc agaggttcc tgcccaaccc tgctggggtg   1860
cagctggagg accctgagtt ccaggccagc aacatcatgc acagcatcaa tggctatgtg   1920
tttgacagcc tgcagctgtc tgtgtgcctg catgaggtgg cctactggta catcctgagc   1980
attgggsccc agactgactt cctgtctgtg ttcttctctg ctacaccstt caagcacaag   2040
atggtgtatg aggacaccct gaccctgttc cccttctctg ggagactgt gttcatgagc   2100
atggagaacc ctggcctgtg gattctgggc tgccacaact ctgacttcag gaacaggggc   2160
atgactgccc tgctgaaagt ctccagctgt gacaagaaca ctggggacta ctatgaggac   2220
agctatgagg acatctctgc ctacctgctg agcaagaaca atgccattga gcccaggagc   2280
ttcagccaga atccacccgt ccttaagcgc catcagcgcg agatcaccag gaccaccctg   2340
cagtctgacc aggaggagat tgactatgat gacaccatct ctgtggagat gaagaaggag   2400
gactttgaca tctacgacga ggacgagaac cagagcccca ggagcttcca gaagaagacc   2460
aggcactact tcattgctgc tgtggagagg ctgtgggact atggcatgag cagcagcccc   2520
catgtgctga gaacagggc ccagtctggc tctgtgcccc agttcaagaa ggtggtgttc   2580
caggagttca ctgatggcag cttcacccag cccctgtaca gagggagct gaatgagcac   2640
ctgggcctgc tgggccccta catcagggct gaggtggaga caacatcat ggtgaccttc   2700
aggaaccagg ccagcaggcc ctacagcttc tacagcagcc tgatcagcta tgaggaggac   2760
cagaggcagg ggctgagcc aggaagaac tttgtgaagc ccaatgaaac caagaccctac   2820
ttctggaagg tgcagcacca catggccccc accaaggatg agtttgactg caaggcctgg   2880
gcctacttct ctgatgtgga cctggagaag gatgtgcact ctggcctgat tggccccctg   2940
ctggtgtgcc acaccaacac cctgaaccct gcccatggca gcaggtgac tgtgcaggag   3000
tttgccсctgt tcttcaccat ctttgatgaa accaagagct ggtacttcac tgagaacatg   3060
gagaggaact gcagggcccc ctgcaacatc cagatggagg acccccactt caaggagaac   3120
tacaggttcc atgccatcaa tggctacatc atggacaccc tgcctggcct ggtgatggcc   3180
```

-continued

```
caggaccaga ggatcaggtg gtacctgctg agcatgggca gcaatgagaa catccacagc    3240
atccacttct ctggccatgt gttcactgtg aggaagaagg aggagtacaa gatggccctg    3300
tacaacctgt accctggggt gtttgagact gtggagatgc tgcccagcaa ggctggcatc    3360
tggagggtgg agtgcctgat tggggagcac ctgcatgctg gcatgagcac cctgttcctg    3420
gtgtacagca acaagtgcca gaccccctg ggcatggcct ctggccacat cagggacttc    3480
cagatcactg cctctggcca gtatggccag tgggccccca agctggccag gctgcactac    3540
tctggcagca tcaatgcctg gagcaccaag gagcccttca gctggatcaa ggtggacctg    3600 ctggcccca tgatcatcca tggcatcaag acccagggg ccaggcagaa gttcagcagc    3660
ctgtacatca gccagttcat catcatgtac agcctggatg gcaagaagtg gcagacctac    3720
aggggcaaca gcactggcac cctgatggtg ttctttggca atgtggacag ctctggcatc    3780
aagcacaaca tcttcaaccc ccccatcatt gccagataca tcaggctgca ccccacccac    3840
tacagcatca ggagcaccct gaggatggag ctgatgggct gtgacctgaa cagctgcagc    3900
atgcccctgg gcatggagag caaggccatc tctgatgccc agatcactgc cagcagctac    3960
ttcaccaaca tgtttgccac ctggagcccc agcaaggcca ggctgcatct gcagggcagg    4020
agcaatgcct ggaggcccca ggtcaacaac cccaaggagt ggctgcaggt ggacttccag    4080
aagaccatga aggtgactgg ggtgaccacc aggggggtga gagcctgct gaccagcatg    4140 tatgtgaagg agttcctgat cagcagcagc aggatggcc accagtggac cctgttcttc    4200
cagaatggca aggtgaaggt gttccagggc aaccaggaca gcttcacccc tgtggtgaac    4260
agcctggacc ccccctgct gaccagatac ctgaggattc accccagag ctgggtgcac    4320 cagattgccc tgaggatgga ggtgctgggc tgtgaggccc aggacctgta ctga         4374
```

<210> SEQ ID NO 5
<211> LENGTH: 4894
<212> TYPE: DNA
<213> ORGANISM: Unknown
<220> FEATURE:
<223> OTHER INFORMATION: Description of Unknown:
      Expression cassette sequence

<400> SEQUENCE: 5

```
gcggcctaag cttggaacca ttgccacctt caggggagg ctgctggtga atattaacca      60
agatcacccc agttaccgga ggagcaaaca gggactaagt tcacacgcgt ggtaccgtct    120
gtctgcacat ttcgtagagc gagtgttccg atactctaat ctccctaggc aaggttcata    180
tttgtgtagg ttacttattc tccttttgtt gactaagtca ataatcagaa tcagcaggtt    240
tggagtcagc ttggcaggga tcagcagcct gggttggaag aggggggtat aaaagcccct    300
tcaccaggag aagccgtcac acagatccac aagctcctga gaggtaagg gtttaagtta    360 tcgttagttc gtgcaccatt aatgtttaat tacctggagc acctgcctga aatcattttt    420
ttttcaggtt ggctagtatg cagatcgagc tctccacctg cttctttctg tgcctgttga    480
gattctgctt cagcgccacc aggagatact acctggggc tgtggagctg agctgggact    540
acatgcagtc tgacctgggg gagctgcctg tggatgccag gttcccccc agagtgccca    600 agagcttccc cttcaacacc tctgtggtgt acaagaagac cctgtttgtg agttcactg    660 accacctgtt caacattgcc aagcccaggc cccctggat gggcctgctg gccccacca    720 tccaggctga ggtgtatgac actgtggtga tcaccctgaa gaacatggcc agccaccctg    780
tgagcctgca tgctgtgggg gtgagctact ggaaggcctc tgagggggct gagtatgatg    840
```

```
accagaccag ccagagggag aaggaggatg acaaggtgtt ccctgggggc agccacacct      900
atgtgtggca ggtgctgaag gagaatggcc ccatggcctc tgaccccctg tgcctgacct      960
acagctacct gagccatgtg gacctggtga aggacctgaa ctctggcctg attggggccc     1020
tgctggtgtg cagggagggc agcctggcca aggagaagac ccagaccctg cacaagttca     1080
tcctgctgtt tgctgtgttt gatgagggca agagctggca ctctgaaacc aagaacagcc     1140
tgatgcagga cagggatgct gcctctgcca gggcctggcc caagatgcac actgtgaatg     1200
gctatgtgaa caggagcctg cctggcctga ttggctgcca caggaagtct gtgtactggc     1260
atgtgattgg catgggcacc accctgagg tgcacagcat cttcctggag gccacacct      1320
tcctggtcag gaaccacagg caggccagcc tggagatcag ccccatcacc ttcctgactg     1380
cccagaccct gctgatggac ctgggccagt tcctgctgtt ctgccacatc agcagccacc     1440
agcatgatgg catggaggcc tatgtgaagg tggacagctg ccctgaggag ccccagctga     1500
ggatgaagaa caatgaggag gctgaggact atgatgatga cctgactgac tctgagatgg     1560
atgtggtgag gtttgatgat gacaacagcc ccagcttcat ccagatcagg tctgtggcca     1620
agaagcaccc caagacctgg gtgcactaca ttgctgctga ggaggaggac tgggactatg     1680
cccccctggt gctggcccct gatgacagga gctacaagag ccagtacctg aacaatggcc     1740
cccagaggat tggcaggaag tacaagaagg tcaggttcat ggcctacact gatgaaacct     1800
tcaagaccag ggaggccatc cagcatgagt ctggcatcct gggcccctg ctgtatgggg      1860
aggtggggga cacctgctg atcatcttca agaaccaggc cagcaggccc tacaacatct      1920
acccccatgg catcactgat gtgaggcccc tgtacagcag gagctgccc aaggggtga       1980
agcacctgaa ggacttcccc atcctgcctg gggagatctt caagtacaag tggactgtga     2040
ctgtggagga tggcccacc aagtctgacc ccaggtgcct gaccagatac tacagcagct      2100
ttgtgaacat ggagagggac ctggcctctg gctgattgg ccccctgctg atctgctaca      2160
aggagtctgt ggaccagagg ggcaaccaga tcatgtctga caagaggaat gtgatcctgt     2220
tctctgtgtt tgatgagaac aggagctggt acctgactga gaacatccag aggttcctgc     2280
ccaaccctgc tggggtgcag ctggaggacc ctgagttcca ggccagcaac atcatgcaca     2340
gcatcaatgg ctatgtgttt gacagcctgc agctgtctgt gtgcctgcat gaggtggcct     2400
actggtacat cctgagcatt ggggcccaga ctgacttcct gtctgtgttc ttctctggct     2460
acaccttcaa gcacaagatg gtgtatgagg acaccctgac cctgttcccc ttctctgggg     2520
agactgtgtt catgagcatg gagaaccctg gcctgtggat tctgggctgc acaactctg      2580
acttcaggaa caggggcatg actgccctgc tgaaagtctc cagctgtgac aagaacactg     2640
gggactacta tgaggacagc tatgaggaca tctctgccta cctgctgagc aagaacaatg     2700
ccattgagcc caggagcttc agccagaatc caccccgtcct taagcgccat cagcgcgaga     2760
tcaccaggac caccctgcag tctgaccagg aggagattga ctatgatgac accatctctg     2820
tggagatgaa gaaggaggac tttgacatct acgacgagga cgaaccag agccccagga       2880
gcttccagaa gaagaccagg cactacttca ttgctgctgt ggagaggctg tgggactatg     2940
gcatgagcag cagccccat gtgctgagga caggccca gtctggctct gtgccccagt       3000
tcaagaaggt ggtgttccag gagttcactg atggcagctt cacccagccc ctgtacagag     3060
gggagctgaa tgagcacctg gcctgctgg cccctacat cagggctgag gtggaggaca       3120
acatcatggt gaccttcagg aaccaggcca gcaggcccta cagcttctac agcagcctga     3180
tcagctatga ggaggaccag aggcaggggg ctgagcccag gaagaacttt gtgaagccca     3240
```

-continued

```
atgaaaccaa gacctacttc tggaaggtgc agcaccacat ggcccccacc aaggatgagt    3300
ttgactgcaa ggcctgggcc tacttctctg atgtggacct ggagaaggat gtgcactctg    3360
gcctgattgg cccctgctg gtgtgccaca ccaacaccct gaaccctgcc catggcaggc    3420
aggtgactgt gcaggagttt gccctgttct caccatctt tgatgaaacc aagagctggt    3480
acttcactga gaacatggag aggaactgca gggcccctg caacatccag atggaggacc    3540
ccaccttcaa ggagaactac aggttccatg ccatcaatgg ctacatcatg gacaccctgc    3600
ctggcctggt gatggcccag gaccagagga tcaggtggta cctgctgagc atgggcagca    3660
atgagaacat ccacagcatc cacttctctg ccatgtgtt cactgtgagg aagaaggagg    3720
agtacaagat ggccctgtac aacctgtacc ctggggtgtt tgagactgtg gagatgctgc    3780
ccagcaaggc tggcatctgg agggtggagt gcctgattgg ggagcacctg catgctggca    3840
tgagcaccct gttcctggtg tacagcaaca agtgccagac ccccctgggc atggcctctg    3900
gccacatcag ggacttccag atcactgcct ctggccagta tggccagtgg gcccccaagc    3960
tggccaggct gcactactct ggcagcatca atgcctggag caccaaggag cccttcagct    4020
ggatcaaggt ggacctgctg gcccccatga tcatccatgg catcaagacc caggggggcca    4080 ggcagaagtt cagcagcctg tacatcagcc agttcatcat catgtacagc ctggatggca    4140
agaagtggca gacctacagg ggcaacagca ctggcaccct gatggtgttc tttggcaatg    4200
tggacagctc tggcatcaag cacaacatct tcaacccccc catcattgcc agatacatca    4260
ggctgcaccc cacccactac agcatcagga gcacctgag gatggagctg atgggctgtg    4320
acctgaacag ctgcagcatg cccctgggca tggagagcaa ggccatctct gatgcccaga    4380
tcactgccag cagctacttc accaacatgt tgccacctg gagccccagc aaggccaggc    4440
tgcatctgca gggcaggagc aatgcctgga ggccccaggt caacaacccc aaggagtggc    4500
tgcaggtgga cttccagaag accatgaagg tgactggggt gacccaccag ggggtgaaga    4560
gcctgctgac cagcatgtat gtgaaggagt tcctgatcag cagcagccag gatggccacc    4620 agtggacccct gttcttccag aatggcaagg tgaaggtgtt ccagggcaac caggacagct    4680 tcaccctgt ggtgaacagc ctggacccc cctgctgac cagatacctg aggattcacc    4740
cccagagctg ggtgcaccag attgccctga ggatggaggt gctgggctgt gaggcccagg    4800
acctgtactg aggatccaat aaaatatctt tattttcatt acatctgtgt gttggttttt    4860
tgtgtgtttt cctgtaacga tcgggctcga gcgc                                4894
```

<210> SEQ ID NO 6
<211> LENGTH: 23
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 6
ggagatgaag aaggaggact ttg                                              23

<210> SEQ ID NO 7
<211> LENGTH: 25
<212> TYPE: DNA
<213> ORGANISM: Artificial Sequence
<220> FEATURE:
<223> OTHER INFORMATION: Description of Artificial Sequence: Synthetic
      probe

<400> SEQUENCE: 7
acatctacga cgaggacgag aacca                                              25

<210> SEQ ID NO 8
<211> LENGTH: 21
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 8
tccacagcag caatgaagta g                                                  21

<210> SEQ ID NO 9
<211> LENGTH: 18
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 9
cctgggccag ttcctgct                                                      18

<210> SEQ ID NO 10
<211> LENGTH: 23
<212> TYPE: DNA
<213> ORGANISM: Artificial Sequence
<220> FEATURE:
<223> OTHER INFORMATION: Description of Artificial Sequence: Synthetic
      probe

<400> SEQUENCE: 10
ttctgccaca tcagcagcca cca                                                23

<210> SEQ ID NO 11
<211> LENGTH: 18
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 11
ggcctccatg ccatcatg                                                      18

<210> SEQ ID NO 12
<211> LENGTH: 130
<212> TYPE: DNA
<213> ORGANISM: Adeno-associated virus

<400> SEQUENCE: 12
ctgcgcgctc gctcgctcac tgaggccgcc cgggcaaagc ccgggcgtcg ggcgaccttt        60
ggtcgcccgg cctcagtgag cgagcagcg cgcagagagg gagtggccaa ctccatcact       120
aggggttcct                                                              130

<210> SEQ ID NO 13
<211> LENGTH: 108
<212> TYPE: DNA
<213> ORGANISM: Adeno-associated virus

<400> SEQUENCE: 13
aggaacccct agtgatggag ttggccactc cctctctgcg cgctcgctcg ctcactgagg        60

```
ccgcccgggc tttgcccggg cggcctcagt gagcgagcga gcgcgcag                    108

<210> SEQ ID NO 14
<211> LENGTH: 19
<212> TYPE: PRT
<213> ORGANISM: Homo sapiens

<400> SEQUENCE: 14

Met Gln Ile Glu Leu Ser Thr Cys Phe Phe Leu Cys Leu Leu Arg Phe
1               5                  10                  15

Cys Phe Ser
```

CLINICAL PARAMETERS BY EXPRESSION OF FACTOR VIII

CROSS-REFERENCE TO RELATED PATENT APPLICATIONS

The present application is a national phase application under 35 U.S.C. § 371 of International Patent Application No. PCT/US2019/044946, filed Aug. 2, 2019, which claims benefit of priority to each of U.S. Provisional Patent Application No. 62/714,553, filed Aug. 3, 2018; U.S. Provisional Patent Application No. 62/826,887, filed Mar. 29, 2019; and U.S. Provisional Patent Application No. 62/869,445, filed Jul. 1, 2019. All of the aforementioned priority applications are incorporated by reference in their entirety.

SEQUENCE LISTING

The instant application contains a Sequence Listing, which has been submitted electronically in ASCII format and is hereby incorporated by reference in its entirety. Said ASCII copy, created on Aug. 1, 2019, is named 1147465_SL.txt and is 28,207 bytes in size.

BACKGROUND

Gene therapy can be used to genetically engineer a cell to have one or more inactivated genes and/or to cause that cell to express a product not previously being produced in that cell (e.g., via transgene insertion and/or via correction of an endogenous sequence). Examples of uses of transgene insertion include the insertion of one or more genes encoding one or more novel therapeutic proteins, insertion of a coding sequence encoding a protein that is lacking in the cell or in the individual, insertion of a wild type gene in a cell containing a mutated gene sequence, and/or insertion of a sequence that encodes a structural nucleic acid such as a microRNA or siRNA. Examples of useful applications of 'correction' of an endogenous gene sequence include alterations of disease-associated gene mutations, alterations in sequences encoding splice sites, alterations in regulatory sequences and/or targeted alterations of sequences encoding structural characteristics of a protein.

Hepatic gene transfer provides an effective means of delivering transgenes to a subject for treatment and/or prevention of various disorders, including hemophilias and lysosomal storage disorders. See, e.g., U.S. Pat. No. 9,150,847 and U.S. Publication Nos. 20130177983 and 20140017212. Vectors specific for liver-directed gene therapy have also been described. See, e.g., WO 2014064277; WO 2009130208; EP 2451474B1, Chuah et al., (2014) *Molecular Therapy,* 22, 1605-1613; and Nair et al. (2014) *Blood* 123:3195-3199. These vectors can include the wild-type mouse minute virus (MVM) intron sequence. See, e.g., Haut and Pintel (1998) *J. Virol.* 72: 1834-1843; Haut and Pintel (1998) *Virol.* 258:84-94.

Hemophilias such as Hemophilia A and Hemophilia B, are genetic disorders of the blood-clotting system, characterized by bleeding into joints and soft tissues, and by excessive bleeding into any site experiencing trauma or undergoing surgery. Hemophilia A is clinically indistinguishable from Hemophilia B, but factor VIII (FVIII or F8) is deficient or absent in Hemophilia A while factor IX (FIX or F.IX) is deficient or absent in patients with Hemophilia B. The F8 gene encodes a plasma glycoprotein that circulates in association with von Wilebrand's factor in its inactive form. Upon surface injury, the intrinsic clotting cascade initiates and FVIII is released from the complex and is activated. The activated form works with Factor IX to activate Factor X to become the activated Xa, eventually leading to change of fibrinogen to fibrin and clot induction. See, Levinson et al. (1990) *Genomics* 7(1): 1-11. 40-50% of Hemophilia A patients have a chromosomal inversion involving F8 intron 22 (also known as IVS22). The inversion is caused by an intra-chromosomal recombination event between a 9.6 kb sequence within the intron 22 of the F8 gene and one of the two closely related inversely orientated sequences located about 300 kb distal to the F8 gene, resulting in an inversion of exons 1 to 22 with respect to exons 23 to 26. See, *Textbook of Hemophilia*. Lee et al. (eds) 2005, Blackwell Publishing. Other hemophilia A patients have defects in F8 including active site mutations, and nonsense and missense mutations.

Clinically, Hemophilia A patients are evaluated and stratified depending on how often a patient has a bleeding episode, and how long those episodes last. Both of these characteristics are directly dependent on the amount of FVIII protein in a patient's blood. Patients with severe hemophilia typically have less than 1% of the normal blood level of FVIII, experience bleeding following injury and often spontaneous bleeding into their joints. Moderate patients have 1-5% of the normal FVIII level while mild patients have 6% or more of normal FVIII and have bleeding episodes only after serious injury, trauma or surgery (Kulkami et al. (2009) *Haemophilia* 15: 1281-90). Patients with Hemophilia A are treated with replacement FVIII protein (often referred to as "factor") derived either from human plasma or produced recombinantly where the frequency of treatment is based upon bleeding patterns and severity of the hemophilia. Patients with severe Hemophilia A receive prophylaxtic treatment on a regular basis to prevent bleeds from occurring while less severe patients can receive treatment only as needed following injury.

Gene therapy for patients with Hemophilia A or B, involving the introduction of plasmid and other vectors (e.g., AAV) encoding a functional FVIII or F.IX proteins have been described. (See, e.g., U.S. Pat. Nos. 6,936,243; 7,238,346 and 6,200,560; Shi et al. (2007) *J Thromb Haemost.* (2): 352-61; Lee et al. (2004) *Pharm. Res.* 7: 1229-1232; Graham et al. (2008) *Genet Vaccines Ther.* 3:6-9; Manno et al. (2003) *Blood* 101(8): 2963-72; Manno et al. (2006) *Nature Medicine* 12(3): 342-7; Nathwani et al. (2011) *Mol Ther* 19(5): 876-85; Nathwani et al. (2011); *N Engl J Med.* 365(25): 2357-65 and Mcintosh et al. (2013) *Blood* 121 (17): 3335-44).

BRIEF SUMMARY OF THE INVENTION

AAV vectors expressing Factor VIII and methods of treatment of hemophilia as well as other aspects are disclosed. In some embodiments, a method of providing a Factor VIII (FVIII) protein to a human is provided. In some embodiments, the method comprises administering to the human one or more dose of from $6 \times 10^{11}$ to $1 \times 10^{13}$ or $3 \times 10^{13}$, $1 \times 10^{13}$ to $1 \times 10^{14}$, or $1 \times 10^{13}$ to $5 \times 10^{13}$, or $2 \times 10^{13}$ to $4 \times 10^{13}$ vg/kg of an Adenovirus-Associated Virus (AAV) vector as described herein, wherein administration of the AAV vector results in production of the Factor VIII protein in the human. In some embodiments, the dose is $9 \times 10^{11}$ vg/kg, $2 \times 10^{12}$ vg/kg, $1 \times 10^{13}$ vg/kg, $2 \times 10^{13}$ vg/kg, $3 \times 10^{13}$ vg/kg or $4 \times 10^{13}$ vg/kg. In some embodiments, the AAV vector has an AAV6 serotype comprising a nucleotide sequence comprising AAV2 inverted terminal repeat sequences flanking an expression cassette comprising a liver-specific enhancer and a promoter operably linked to a polynucleotide encoding SEQ ID NO:1.

In some embodiments, the method further comprises measuring FVIII protein in blood of the human before and after the administrating.

In some embodiments, administration of the AAV vector, e.g., at a dose ranging from $1\times10^{13}$ vg/kg to $3\times10^{13}$ or $1\times10^{13}$ to $1\times10^{14}$, or $1\times10^{13}$ to $5\times10^{13}$, or $2\times10^{13}$ to $4\times10^{13}$ vg/kg, results in a clinically relevant increase in FVIII activity, relative to patient circulating FVIII activity assessed in the patient before administration, ranging from 5% to 150%, or greater. In some embodiments, administration of the AAV vector, e.g., at a dose of $3\times10^{13}$ vg/kg, results in a clinically relevant increase in FVIII activity ranging from 20% to 150%, or greater. In some embodiments, administration results in one or zero occurrences of spontaneous bleeding episodes in the human subject between 3-12 months (or, e.g., 3-6 months, 3 months-1, 2, 5 or 10 years, or more) after administration.

In some embodiments, provided herein is a method of increasing Factor VIII (FVIII) protein in a human subject, comprising administering to the human subject one or more doses of from $2\times10^{12}$ vg/kg to $3\times10^{13}$ or $1\times10^{13}$ to $1\times10^{14}$, or $1\times10^{13}$ to $5\times10^{13}$, or $2\times10^{13}$ to $4\times10^{13}$ vg/kg of an Adenovirus-Associated Virus (AAV) vector that encodes a FVIII protein (optionally comprising the amino acid sequence of SEQ ID NO:1), wherein administration of the AAV vector results in a clinically relevant increase of the level of circulating FVIII activity, e.g., by 5% to 150%; or by 50% to 150%. In some embodiments, the one or more doses of Factor VIII administered to the patient is in the range from $1\times10^{13}$ vg/kg to $3\times10^{13}$ vg/kg. In some embodiments, the AAV vector has an AAV6 serotype. In some embodiments, the AAV vector comprises an expression cassette comprising a polynucleotide that encodes the FVIII protein operably linked to a liver-specific enhancer and a promoter. In some embodiments, the liver-specific enhancer is a Serpin 1 enhancer and/or the promoter is a transthyretin minimal promoter. In some embodiments, the liver-specific enhancer comprises the nucleotide sequence of SEQ ID NO:2 and/or the promoter comprises the nucleotide sequence of SEQ ID NO:3. In some embodiments, the AAV vector comprises a AAV2 5' inverted terminal repeat (ITR) sequence and AAV2 3' ITR sequence that flank the expression cassette. In some embodiments, the AAV2 5' ITR comprises the nucleotide sequence of SEQ ID NO:12 and/or the AAV2 3'ITR comprises the nucleotide sequence of SEQ ID NO:13. In some embodiments, the sequence of the expression cassette comprises the nucleotide sequence of SEQ ID NO:5. In some embodiments the human subject has hemophilia.

In some embodiments, provided herein is a method of increasing Factor VIII (FVIII) protein in a human subject, comprising administering to the human subject one or more doses of from $2\times10^{12}$ vg/kg to $3\times10^{13}$ or $1\times10^{13}$ to $1\times10^{14}$, or $1\times10^{13}$ to $5\times10^{13}$, or $2\times10^{13}$ to $4\times10^{13}$ vg/kg of an Adenovirus-Associated Virus (AAV) vector that encodes a FVIII protein (optionally comprising the amino acid sequence of SEQ ID NO:1), wherein administration of the AAV vector results a reduction of the number of FVIII treatments the human subject receives. In some embodiments, the human subject does not receive any FVIII treatments 3-12 months (or, e.g., 3-6 months, 3 months-1, 2, 5 or 10 years, or more) after administration. In some embodiments, the one or more doses of Factor VIII administered to the patient is in the range from $1\times10^{13}$ vg/kg to $3\times10^{13}$ vg/kg. In some embodiments, the AAV vector has an AAV6 serotype. In some embodiments, the AAV vector comprises an expression cassette comprising a polynucleotide that encodes the FVIII protein operably linked to a liver-specific enhancer and a promoter. In some embodiments, the liver-specific enhancer is a Serpin 1 enhancer and/or the promoter is a transthyretin minimal promoter. In some embodiments, the liver-specific enhancer comprises the nucleotide sequence of SEQ ID NO:2 and/or the promoter comprises the nucleotide sequence of SEQ ID NO:3. In some embodiments, the AAV vector comprises a AAV2 5' inverted terminal repeat (ITR) sequence and AAV2 3' ITR sequence that flank the expression cassette. In some embodiments, the AAV2 5' ITR comprises the nucleotide sequence of SEQ ID NO:12 and/or the AAV2 3'ITR comprises the nucleotide sequence of SEQ ID NO:13. In some embodiments, the sequence of the expression cassette comprises the nucleotide sequence of SEQ ID NO:5. In some embodiments the human subject has hemophilia.

In some embodiments, administration of the AAV vector, e.g., at a dose ranging from $2\times10^{12}$ vg/kg to $3\times10^{13}$ or $1\times10^{13}$ to $1\times10^{14}$, or $1\times10^{13}$ to $5\times10^{13}$, or $2\times10^{13}$ to $4\times10^{13}$ vg/kg, results in a reduction in use of FVIII treatments, e.g., a reduction in the number of FVIII injections a patient receives per week or per month. In some embodiments, use of FVIII is reduced by at least 20%. In further embodiments, use of FVIII is reduced by at least 50%. In some embodiments, use of FVIII is reduced by 90% or greater.

In some embodiments, prior to the administrating the human had less than 1% of normal human circulating FVIII activity and within 2, 4, 6, 8, 10, 12, 16, 20, 24, 28, 32, 36, 40, 44, 48, or 52 weeks after the administrating the human has at least 1% of normal human circulating FVIII activity.

In some embodiments, prior to the administrating the human had less than 5% of normal human circulating FVIII activity and within 2, 4, 6, 8, 10, 12, 16, 20, 24, 28, 32, 36, 40, 44, 48, or 52 weeks after the administrating the human has at least 5% of normal human circulating FVIII activity.

In some embodiments, the human displays no more than 1.5 times upper limit of normal (ULN) of at least one of alanine aminotransferase (ALT), aspartate aminotransferase (AST), bilirubin, alkaline phosphatase, or albumin within 2, 4, 6, 8, 10, 12, 16, 20, 24, 28, 32, 36, 40, 44, 48, or 52 weeks of the administering.

In some embodiments, the human does not have detectable levels of FVIII inhibitor 4, 8, 12, 16, 20, 24, 28, 32, 36, 40, 44, 48, or 52 weeks after the administrating.

In some embodiments, the subject to be administered the AAV vector undergoes prophylactic steroid treatment.

In some embodiments, the method further comprises measuring a level of at least one of Von Willebrand factor (vWF), soluble epidermal growth factor receptor (sEGFR), Galectin-3-binding protein (GAL3BP), C-reactive protein (CRP), IL-6, circulating alpha fetoprotein, prior to the administrating and within 2, 4, 6, 8, 10, 12, 16, 20, 24, 28, 32, 36, 40, 44, 48, or 52 weeks after the administering.

In some embodiments, a level of Von Willebrand factor (vWF), soluble epidermal growth factor receptor (sEGFR), Galectin-3-binding protein (GAL3BP), C-reactive protein (CRP), IL-6, circulating alpha fetoprotein, within 2, 4, 6, 8, 10, 12, 16, 20, 24, 28, 32, 36, 40, 44, 48, or 52 weeks after the administering is no more than 1.5 times a level within two weeks prior to the administering.

In some embodiments, the human displays fewer bleeding episodes after the administering. In some embodiments, the human has 10%, 15%, 20%, 25%, 30%, 35%, 40%, 45%, 50%, 55%, 60%, 65%, 70%, 75%, 80%, 85%, 90%, 95%, or 100% fewer bleeding episodes after the administering.

In some embodiments, the human displays a reduced need for treatment with replacement Factor VIII protein. In some embodiments, the human requires 10%, 15%, 20%, 25%, 30%, 35%, 40%, 45%, 50%, 55%, 60%, 65%, 70%, 75%, 80%, 85%, 90%, 95%, or 100% less treatment with replacement Factor VIII protein after the administering.

In some embodiments, the human has hemophilia.

In some embodiments, the nucleotide sequence comprises SEQ ID NO:5. In some embodiments, the AAV2 inverted terminal repeat sequences are SEQ ID NO:12 and SEQ ID NO:13.

BRIEF DESCRIPTION OF THE DRAWINGS

FIG. 7 shows FVIII usage of patients three or more weeks post-vector injection.
FIG. 8 provides a Serious Adverse Event (SAE) summary.
FIG. 9 provides a Treatment-Related Adverse Event (AE) Summary.
FIG. 10 provides a summary of results.

DETAILED DESCRIPTION OF THE INVENTION

Introduction

Figure 1:
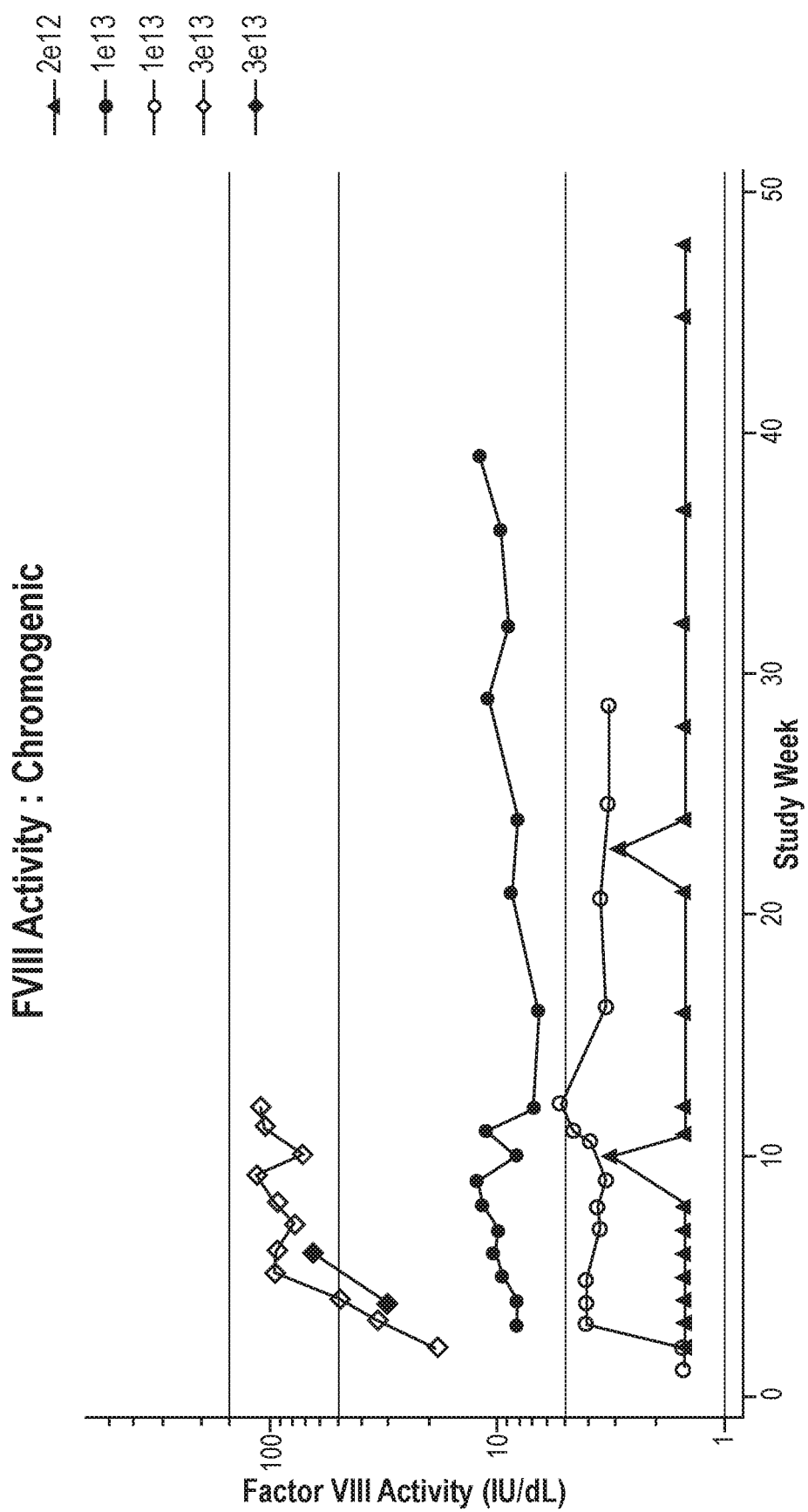
FIG. 1 shows FVIII activity data from Example 6 using a chromogenic assay as described in Example 1.

The inventors have discovered that certain AAV vectors expressing Factor VIII (FVIII) are effective in generating increased FVIII activity in humans, including humans having hemophilia. For example, it has been discovered that administration of the AAV vector as described herein in some embodiments results in raised circulating FVIII activity from less than 1% normal FVIII activity to at least 1% and in some embodiments at least 2, 3, 4, or 5% normal FVIII activity. Moreover, in some embodiments, circulating FVIII activity is increased in a human with little or no adverse effect on liver function or other biomarkers as described herein. At administered concentrations of vector at or above $1\times10^{13}$ vg/kg, rates of bleeding episodes at 3 weeks (or more than 3 weeks) after administration dropped to zero for most patients, indicating that concentrations at or above $1\times10^{13}$ vg/kg (e.g., $1\times10^{13}$ vg/kg to $1\times10^{14}$ vg/kg, e.g. $2\text{-}4\times10^{13}$ vg/kg) resulted in highly effective treatment. Thus, in some embodiments, patients receiving the vector at these concentrations do not require further FVIII infusions, or at least do not require them in within 3, 6, 9, or 12 months after vector administration.

Adeno-Associated Virus (AAV) vectors that encode FVIII are provided. Exemplary AAV vectors are of the AAV6 serotype and comprise inverted repeat (ITR) sequences flanking an expression cassette comprising a liver-specific enhancer and promoter operably linked to an intron and a polynucleotide encoding FVIII. An exemplary FVIII is SEQ ID NO:1. In some embodiments, the ITR sequences are AAV2 ITRs, and thus the vector can be referred to as an "AAV2/6" vector. For the genomic sequence of AAV serotypes and a discussion of the genomic similarities see, for example, GenBank Accession number AF028704.1; GenBank Accession number J01901.1; Chiorini et al., *J. Vir.* 71: 6823-33(1997); Srivastava et al., *J. Vir.* 45:555-64 (1983); Chiorini et al., *J. Vir.* 73: 1309-1319 (1999); Rutledge et al., *J. Vir.* 72:309-319 (1998); and Wu et al., *J. Vir.* 74: 8635-47 (2000).

Exemplary AAV2 ITR Sequences are:

AAV2 5' ITR:
(SEQ ID NO: 12)
CTGCGCGCTCGCTCGCTCACTGAGGCCGCCCGGGCAAAGCCCGGGCGTCG
GGCGACCTTTGGTCGCCCGGCCTCAGTGAGCGAGCGAGCGCGCAGAGAGG
GAGTGGCCAACTCCATCACTAGGGGTTCCT.

AAV2 3'ITR:
(SEQ ID NO: 13)
AGGAACCCCTAGTGATGGAGTTGGCCACTCCCTCTCTGCGCGCTCGCTCG
CTCACTGAGGCCGCCCGGGCTTTGCCCGGGCGGCCTCAGTGAGCGAGCGA
GCGCGCAG.

Exemplary liver-specific enhancers include for example a wild-type or mutated Serpin1 enhancers and an exemplary promoter is a transthyretin minimal (TTRm) promoter. Thus in some embodiments, the AAV vector is an AAV2/6 vector comprising AAV2 ITR sequences flanking a wild-type or mutated Serpin1 enhancer linked to a TTRm promoter operably linked to a polynucleotide encoding FVIII (e.g., SEQ ID NO:1). Exemplary vector sequences are described in for example, WO 2017/074526.

SEQ ID NO: 1 Displays the Human FVIII Amino Acid Sequence with Signal Peptide:

MQIELSTCFFLCLLRFCFSATRRYYLGAVELSWDYMQSDLGELPVDARF

PPRVPKSFPFNTSVVYKKTLFVEFTDHLFNIAKPRPPWMGLLGPTIQAE

VYDTVVITLKNMASHPVSLHAVGVSYWKASEGAEYDDQTSQREKEDDKV

FPGGSHTYVWQVLKENGPMASDPLCLTYSYLSHVDLVKDLNSGLIGALL

VCREGSLAKEKTQTLHKFILLFAVFDEGKSWHSETKNSLMQDRDAASAR

AWPKMHTVNGYVNRSLPGLIGCHRKSVYWHVIGMGTTPEVHSIFLEGHT

FLVRNHRQASLEISPITFLTAQTLLMDLGQFLLFCHISSHQHDGMEAYV

KVDSCPEEPQLRMKNNEEAEDYDDDLTDSEMDVVRFDDDNSPSFIQIRS

VAKKHPKTWVHYIAAEEEDWDYAPLVLAPDDRSYKSQYLNNGPQRIGRK

YKKVRFMAYTDETFKTREAIQHESGILGPLLYGEVGDTLLIIFKNQASR

PYNIYPHGITDVRPLYSRRLPKGVKHLKDFPILPGEIFKYKWTVTVEDG

PTKSDPRCLTRYYSSFVNMERDLASGLIGPLLICYKESVDQRGNQIMSD

KRNVILFSVFDENRSWYLTENIQRFLPNPAGVQLEDPEFQASNIMHSIN

GYVFDSLQLSVCLHEVAYWYILSIGAQTDFLSVFFSGYTFKHKMVYEDT

LTLFPFSGETVFMSMENPGLWILGCHNSDFRNRGMTALLKVSSCDKNTG

DYYEDSYEDISAYLLSKNNAIEPRSFSQNPPVLKRHQREITRTTLQSDQ

EEIDYDDTISVEMKKEDFDIYDEDENQSPRSFQKKTRHYFIAAVERLWD

YGMSSSPHVLRNRAQSGSVPQFKKVVFQEFTDGSFTQPLYRGELNEHLG

LLGPYIRAEVEDNIMVTFRNQASRPYSFYSSLISYEEDQRQGAEPRKNF

VKPNETKTYFWKVQHHMAPTKDEFDCKAWAYFSDVDLEKDVHSGLIGPL

LVCHTNTLNPAHGRQVTVQEFALFFTIFDETKSWYFTENMERNCRAPCN

IQMEDPTFKENYRFHAINGYIMDTLPGLVMAQDQRIRWYLLSMGSNENI

HSIHFSGHVFTVRKKEEYKMALYNLYPGVFETVEMLPSKAGIWRVECLI

GEHLHAGMSTLFLVYSNKCQTPLGMASGHIRDFQITASGQYGQWAPKLA

RLHYSGSINAWSTKEPFSWIKVDLLAPMIIHGIKTQGARQKFSSLYISQ

FIIMYSLDGKKWQTYRGNSTGTLMVFFGNVDSSGIKHNIFNPPIIARYI

RLHPTHYSIRSTLRMELMGCDLNSCSMPLGMESKAISDAQITASSYFTN

MFATWSPSKARLHLQGRSNAWRPQVNNPKEWLQVDFQKTMKVTGVTTQG

VKSLLTSMYVKEFLISSSQDGHQWTLFFQNGKVKVFQGNQDSFTPVVNS

LDPPLLTRYLRIHPQSWVHQIALRMEVLGCEAQDLY.

The signal peptide portion of SEQ ID NO:1 is MQIEL-STCFFLCLLRFCFS (SEQ ID NO:14), which is cleaved off when the protein is secreted.

For example, an exemplary SERPIN1 enhancer is (SEQ ID NO: 2)
GGGGGAGGCTGCTGGTGAATATTAACCAAGATCACCCCAGTTACCGGAG
GAGCAAACAGGGACTAAGTTCACACGCGTGGTACC.

An exemplary TTRm promoter is (SEQ ID NO: 3)
GTCTGTCTGCACATTTCGTAGAGCGAGTGTTCCGATACTCTAATCTCCC

TAGGCAAGGTTCATATTTGTGTAGGTTACTTATTCTCCTTTTGTTGACT

AAGTCAATAATCAGAATCAGCAGGTTTGGAGTCAGCTTGGCAGGGATCA

GCAGCCTGGGTTGGAAGGAGGGGGTATAAAAGCCCCTTCACCAGGAGAA

GCCGTCACACAGATCCACAAGCTCCTG.

An exemplary coding sequence for FVIII is:

(SEQ ID NO: 4)
ATGCAGATCGAGCTCTCCACCTGCTTCTTTCTGTGCCTGTTGAGATTCT

GCTTCAGCGCCACCAGGAGATACTACCTGGGGGCTGTGGAGCTGAGCTG

GGACTACATGCAGTCTGACCTGGGGGAGCTGCCTGTGGATGCCAGGTTC

CCCCCCAGAGTGCCCAAGAGCTTCCCCTTCAACACCTCTGTGGTGTACA

AGAAGACCCTGTTTGTGGAGTTCACTGACCACCTGTTCAACATTGCCAA

GCCCAGGCCCCCTGGATGGGCCTGCTGGGCCCCACCATCCAGGCTGAG

GTGTATGACACTGTGGTGATCACCCTGAAGAACATGGCCAGCCACCCTG

TGAGCCTGCATGCTGTGGGGGTGAGCTACTGGAAGGCCTCTGAGGGGGC

TGAGTATGATGACCAGACCAGCCAGGGGAGAAGGAGGATGACAAGGTG

TTCCCTGGGGGCAGCCACACCTATGTGTGGCAGGTGCTGAAGGAGAATG

GCCCCATGGCCTCTGACCCCCTGTGCCTGACCTACAGCTACCTGAGCCA

TGTGGACCTGGTGAAGGACCTGAACTCTGGCCTGATTGGGGCCCTGCTG

GTGTGCAGGAGGGCAGCCTGGCCAAGGAGAAGACCCAGACCCTGCACA

AGTTCATCCTGCTGTTTGCTGTGTTTGATGAGGGCAAGAGCTGGCACTC

TGAAACCAAGAACAGCCTGATGCAGGACAGGGATGCTGCCTCTGCCAGG

GCCTGGCCCAAGATGCACACTGTGAATGGCTATGTGAACAGGAGCCTGC

CTGGCCTGATTGGCTGCCACAGGAAGTCTGTGTACTGGCATGTGATTGG

CATGGGCACCACCCCTGAGGTGCACAGCATCTTCCTGGAGGGCCACACC

TTCCTGGTCAGGAACCACAGGCAGGCCAGCCTGGAGATCAGCCCCATCA

CCTTCCTGACTGCCCAGACCCTGCTGATGGACCTGGGCCAGTTCCTGCT

GTTCTGCCACATCAGCAGCCACCAGCATGATGGCATGGAGGCCTATGTG

AAGGTGGACAGCTGCCCTGAGGAGCCCCAGCTGAGGATGAAGAACAATG

AGGAGGCTGAGGACTATGATGATGACCTGACTGACTCTGAGATGGATGT

GGTGAGGTTTGATGATGACAACAGCCCCAGCTTCATCCAGATCAGGTCT

GTGGCCAAGAAGCACCCCAAGACCTGGGTGCACTACATTGCTGCTGAGG

AGGAGGACTGGGACTATGCCCCCCTGGTGCTGGCCCCTGATGACAGGAG

CTACAAGAGCCAGTACCTGAACAATGGCCCCCAGAGGATTGGCAGGAAG

TACAAGAAGGTCAGGTTCATGGCCTACACTGATGAAACCTTCAAGACCA

GGGAGGCCATCCAGCATGAGTCTGGCATCCTGGGCCCCCTGCTGTATGG

GGAGGTGGGGGACACCCTGCTGATCATCTTCAAGAACCAGGCCAGCAGG

CCCTACAACATCTACCCCCATGGCATCACTGATGTGAGGCCCCTGTACA

GCAGGAGGCTGCCCAAGGGGGTGAAGCACCTGAAGGACTTCCCCATCCT

GCCTGGGGAGATCTTCAAGTACAAGTGGACTGTGACTGTGGAGGATGGC

CCCACCAAGTCTGACCCCAGGTGCCTGACCAGATACTACAGCAGCTTTG

TGAACATGGAGAGGGACCTGGCCTCTGGCCTGATTGGCCCCCTGCTGAT

CTGCTACAAGGAGTCTGTGGACCAGAGGGGCAACCAGATCATGTCTGAC

AAGAGGAATGTGATCCTGTTCTCTGTGTTTGATGAGAACAGGAGCTGGT

ACCTGACTGAGAACATCCAGAGGTTCCTGCCCAACCCTGCTGGGGTGCA

GCTGGAGGACCCTGAGTTCCAGGCCAGCAACATCATGCACAGCATCAAT

GGCTATGTGTTTGACAGCCTGCAGCTGTCTGTGTGCCTGCATGAGGTGG

CCTACTGGTACATCCTGAGCATTGGGGCCCAGACTGACTTCCTGTCTGT

GTTCTTCTCTGGCTACACCTTCAAGCACAAGATGGTGTATGAGGACACC

CTGACCCTGTTCCCCTTCTCTGGGGAGACTGTGTTCATGAGCATGGAGA

ACCCTGGCCTGTGGATTCTGGGCTGCCACAACTCTGACTTCAGGAACAG

GGGCATGACTGCCCTGCTGAAAGTCTCCAGCTGTGACAAGAACACTGGG

GACTACTATGAGGACAGCTATGAGGACATCTCTGCCTACCTGCTGAGCA

AGAACAATGCCATTGAGCCCAGGAGCTTCAGCCAGAATCCACCCGTCCT

TAAGCGCCATCAGCGCGAGATCACCAGGACCACCCTGCAGTCTGACCAG

GAGGAGATTGACTATGATGACACCATCTCTGTGGAGATGAAGAAGGAGG

ACTTTGACATCTACGACGAGGACGAGAACCAGAGCCCCAGGAGCTTCCA

GAAGAAGACCAGGCACTACTTCATTGCTGCTGTGGAGAGGCTGTGGGAC

TATGGCATGAGCAGCAGCCCCCATGTGCTGAGGAACAGGGCCCAGTCTG

GCTCTGTGCCCCAGTTCAAGAAGGTGGTGTTCCAGGAGTTCACTGATGG

CAGCTTCACCCAGCCCCTGTACAGAGGGGAGCTGAATGAGCACCTGGGC

CTGCTGGGCCCCTACATCAGGGCTGAGGTGGAGGACAACATCATGGTGA

-continued

CCTTCAGGAACCAGGCCAGCAGGCCCTACAGCTTCTACAGCAGCCTGAT

CAGCTATGAGGAGGACCAGAGGCAGGGGGCTGAGCCCAGGAAGAACTTT

GTGAAGCCCAATGAAACCAAGACCTACTTCTGGAAGGTGCAGCACCACA

TGGCCCCCACCAAGGATGAGTTTGACTGCAAGGCCTGGGCCTACTTCTC

TGATGTGGACCTGGAGAAGGATGTGCACTCTGGCCTGATTGGCCCCCTG

CTGGTGTGCCACACCAACACCCTGAACCCTGCCCATGGCAGGCAGGTGA

CTGTGCAGGAGTTTGCCCTGTTCTTCACCATCTTTGATGAAACCAAGAG

CTGGTACTTCACTGAGAACATGGAGAGGAACTGCAGGGCCCCCTGCAAC

ATCCAGATGGAGGACCCCACCTTCAAGGAGAACTACAGGTTCCATGCCA

TCAATGGCTACATCATGGACACCCTGCCTGGCCTGGTGATGGCCCAGGA

CCAGAGGATCAGGTGGTACCTGCTGAGCATGGGCAGCAATGAGAACATC

CACAGCATCCACTTCTCTGGCCATGTGTTCACTGTGAGGAAGAAGGAGG

AGTACAAGATGGCCCTGTACAACCTGTACCCTGGGGTGTTTGAGACTGT

GGAGATGCTGCCCAGCAAGGCTGGCATCTGGAGGGTGGAGTGCCTGATT

GGGGAGCACCTGCATGCTGGCATGAGCACCCTGTTCCTGGTGTACAGCA

ACAAGTGCCAGACCCCCCTGGGCATGGCCTCTGGCCACATCAGGGACTT

CCAGATCACTGCCTCTGGCCAGTATGGCCAGTGGGCCCCCAAGCTGGCC

AGGCTGCACTACTCTGGCAGCATCAATGCCTGGAGCACCAAGGAGCCCT

TCAGCTGGATCAAGGTGGACCTGCTGGCCCCCATGATCATCCATGGCAT

CAAGACCCAGGGGGCCAGGCAGAAGTTCAGCAGCCTGTACATCAGCCAG

TTCATCATCATGTACAGCCTGGATGGCAAGAAGTGGCAGACCTACAGGG

GCAACAGCACTGGCACCCTGATGGTGTTCTTTGGCAATGTGGACAGCTC

TGGCATCAAGCACAACATCTTCAACCCCCCCATCATTGCCAGATACATC

AGGCTGCACCCCACCCACTACAGCATCAGGAGCACCCTGAGGATGGAGC

TGATGGGCTGTGACCTGAACAGCTGCAGCATGCCCCTGGGCATGGAGAG

CAAGGCCATCTCTGATGCCCAGATCACTGCCAGCAGCTACTTCACCAAC

ATGTTTGCCACCTGGAGCCCCAGCAAGGCCAGGCTGCATCTGCAGGGCA

GGAGCAATGCCTGGAGGCCCCAGGTCAACAACCCCAAGGAGTGGCTGCA

GGTGGACTTCCAGAAGACCATGAAGGTGACTGGGGTGACCACCCAGGGG

GTGAAGAGCCTGCTGACCAGCATGTATGTGAAGGAGTTCCTGATCAGCA

GCAGCCAGGATGGCCACCAGTGGACCCTGTTCTTCCAGAATGGCAAGGT

GAAGGTGTTCCAGGGCAACCAGGACAGCTTCACCCCTGTGGTGAACAGC

CTGGACCCCCCCCTGCTGACCAGATACCTGAGGATTCACCCCCAGAGCT

GGGTGCACCAGATTGCCCTGAGGATGGAGGTGCTGGGCTGTGAGGCCCA

GGACCTGTACTGA.

An exemplary sequence for the expression cassette flanked by the inverted terminal repeat sequences is:

(SEQ ID NO: 5)
GCGGCCTAAGCTTGGAACCATTGCCACCTTCAGGGGGAGGCTGCTGGTGA - 50

ATATTAACCAAGATCACCCCAGTTACCGGAGGAGCAAACAGGGACTAAGT - 100

TCACACGCGTGGTACCGTCTGTCTGCACATTTCGTAGAGCGAGTGTTCCG - 150

ATACTCTAATCTCCCTAGGCAAGGTTCATATTTGTGTAGGTTACTTATTC - 200

TCCTTTTGTTGACTAAGTCAATAATCAGAATCAGCAGGTTTGGAGTCAGC - 250

TTGGCAGGGATCAGCAGCCTGGGTTGGAAGGAGGGGGTATAAAAGCCCCT - 300

TCACCAGGAGAAGCCGTCACACAGATCCACAAGCTCCTGAAGAGGTAAGG - 350

GTTTAAGTTATCGTTAGTTCGTGCACCATTAATGTTTAATTACCTGGAGC - 400

ACCTGCCTGAAATCATTTTTTTTTCAGGTTGGCTAGTATGCAGATCGAGC - 450

TCTCCACCTGCTTCTTTCTGTGCCTGTTGAGATTCTGCTTCAGCGCCACC - 500

AGGAGATACTACCTGGGGGCTGTGGAGCTGAGCTGGGACTACATGCAGTC - 550

TGACCTGGGGGAGCTGCCTGTGGATGCCAGGTTCCCCCCCAGAGTGCCCA - 600

AGAGCTTCCCCTTCAACACCTCTGTGGTGTACAAGAAGACCCTGTTTGTG - 650

GAGTTCACTGACCACCTGTTCAACATTGCCAAGCCCAGGCCCCCCTGGAT - 700

GGGCCTGCTGGGCCCCACCATCCAGGCTGAGGTGTATGACACTGTGGTGA - 750

TCACCCTGAAGAACATGGCCAGCCACCCTGTGAGCCTGCATGCTGTGGGG - 800

GTGAGCTACTGGAAGGCCTCTGAGGGGGCTGAGTATGATGACCAGACCAG - 850

CCAGAGGGAGAAGGAGGATGACAAGGTGTTCCCTGGGGGCAGCCACACCT - 900

ATGTGTGGCAGGTGCTGAAGGAGAATGGCCCCATGGCCTCTGACCCCCTG - 950

TGCCTGACCTACAGCTACCTGAGCCATGTGGACCTGGTGAAGGACCTGAA - 1000

-continued

```
CTCTGGCCTGATTGGGGCCCTGCTGGTGTGCAGGGAGGGCAGCCTGGCCA   -    1050

AGGAGAAGACCCAGACCCTGCACAAGTTCATCCTGCTGTTTGCTGTGTTT   -    1100

GATGAGGGCAAGAGCTGGCACTCTGAAACCAAGAACAGCCTGATGCAGGA   -    1150

CAGGGATGCTGCCTCTGCCAGGGCCTGGCCCAAGATGCACACTGTGAATG   -    1200

GCTATGTGAACAGGAGCCTGCCTGGCCTGATTGGCTGCCACAGGAAGTCT   -    1250

GTGTACTGGCATGTGATTGGCATGGGCACCACCCCTGAGGTGCACAGCAT   -    1300

CTTCCTGGAGGGCCACACCTTCCTGGTCAGGAACCACAGGCAGGCCAGCC   -    1350

TGGAGATCAGCCCCATCACCTTCCTGACTGCCCAGACCCTGCTGATGGAC   -    1400

CTGGGCCAGTTCCTGCTGTTCTGCCACATCAGCAGCCACCAGCATGATGG   -    1450

CATGGAGGCCTATGTGAAGGTGGACAGCTGCCCTGAGGAGCCCCAGCTGA   -    1500

GGATGAAGAACAATGAGGAGGCTGAGGACTATGATGATGACCTGACTGAC   -    1550

TCTGAGATGGATGTGGTGAGGTTTGATGATGACAACAGCCCCAGCTTCAT   -    1600

CCAGATCAGGTCTGTGGCCAAGAAGCACCCCAAGACCTGGGTGCACTACA   -    1650

TTGCTGCTGAGGAGGAGGACTGGGACTATGCCCCCCTGGTGCTGGCCCCT   -    1700

GATGACAGGAGCTACAAGAGCCAGTACCTGAACAATGGCCCCCAGAGGAT   -    1750

TGGCAGGAAGTACAAGAAGGTCAGGTTCATGGCCTACACTGATGAAACCT   -    1800

TCAAGACCAGGGAGGCCATCCAGCATGAGTCTGGCATCCTGGGCCCCCTG   -    1850

CTGTATGGGAGGTGGGGACACCCTGCTGATCATCTTCAAGAACCAGGC    -    1900

CAGCAGGCCCTACAACATCTACCCCCATGGCATCACTGATGTGAGGCCCC   -    1950

TGTACAGCAGGAGGCTGCCCAAGGGGGTGAAGCACCTGAAGGACTTCCCC   -    2000

ATCCTGCCTGGGGAGATCTTCAAGTACAAGTGGACTGTGACTGTGGAGGA   -    2050

TGGCCCCACCAAGTCTGACCCCAGGTGCCTGACCAGATACTACAGCAGCT   -    2100

TTGTGAACATGGAGAGGGACCTGGCCTCTGGCCTGATTGGCCCCCTGCTG   -    2150

ATCTGCTACAAGGAGTCTGTGGACCAGAGGGGCAACCAGATCATGTCTGA   -    2200

CAAGAGGAATGTGATCCTGTTCTCTGTGTTTGATGAGAACAGGAGCTGGT   -    2250

ACCTGACTGAGAACATCCAGAGGTTCCTGCCCAACCCTGCTGGGGTGCAG   -    2300

CTGGAGGACCCTGAGTTCCAGGCCAGCAACATCATGCACAGCATCAATGG   -    2350

CTATGTGTTTGACAGCCTGCAGCTGTCTGTGTGCCTGCATGAGGTGGCCT   -    2400

ACTGGTACATCCTGAGCATTGGGGCCCAGACTGACTTCCTGTCTGTGTTC   -    2450

TTCTCTGGCTACACCTTCAAGCACAAGATGGTGTATGAGGACACCCTGAC   -    2500

CCTGTTCCCCTTCTCTGGGGAGACTGTGTTCATGAGCATGGAGAACCCTG   -    2550

GCCTGTGGATTCTGGGCTGCCACAACTCTGACTTCAGGAACAGGGGCATG   -    2600

ACTGCCCTGCTGAAAGTCTCCAGCTGTGACAAGAACACTGGGGACTACTA   -    2650

TGAGGACAGCTATGAGGACATCTCTGCCTACCTGCTGAGCAAGAACAATG   -    2700

CCATTGAGCCCAGGAGCTTCAGCCAGAATCCACCCGTCCTTAAGCGCCAT   -    2750

CAGCGCGAGATCACCAGGACCACCCTGCAGTCTGACCAGGAGGAGATTGA   -    2800

CTATGATGACACCATCTCTGTGGAGATGAAGAAGGAGGACTTTGACATCT   -    2850

ACGACGAGGACGAGAACCAGAGCCCCAGGAGCTTCCAGAAGAAGACCAGG   -    2900

CACTACTTCATTGCTGCTGTGGAGAGGCTGTGGGACTATGGCATGAGCAG   -    2950

CAGCCCCCATGTGCTGAGGAACAGGGCCCAGTCTGGCTCTGTGCCCCAGT   -    3000

TCAAGAAGGTGGTGTTCCAGGAGTTCACTGATGGCAGCTTCACCCAGCCC   -    3050
```

```
CTGTACAGAGGGGAGCTGAATGAGCACCTGGGCCTGCTGGGCCCCTACAT  - 3100
CAGGGCTGAGGTGGAGGACAACATCATGGTGACCTTCAGGAACCAGGCCA  - 3150
GCAGGCCCTACAGCTTCTACAGCAGCCTGATCAGCTATGAGGAGGACCAG  - 3200
AGGCAGGGGGCTGAGCCCAGGAAGAACTTTGTGAAGCCCAATGAAACCAA  - 3250
GACCTACTTCTGGAAGGTGCAGCACCACATGGCCCCCACCAAGGATGAGT  - 3300
TTGACTGCAAGGCCTGGGCCTACTTCTCTGATGTGGACCTGGAGAAGGAT  - 3350
GTGCACTCTGGCCTGATTGGCCCCCTGCTGGTGTGCCACACCAACACCCT  - 3400
GAACCCTGCCCATGGCAGGCAGGTGACTGTGCAGGAGTTTGCCCTGTTCT  - 3450
TCACCATCTTTGATGAAACCAAGAGCTGGTACTTCACTGAGAACATGGAG  - 3500
AGGAACTGCAGGGCCCCCTGCAACATCCAGATGGAGGACCCCACCTTCAA  - 3550
GGAGAACTACAGGTTCCATGCCATCAATGGCTACATCATGGACACCCTGC  - 3600
CTGGCCTGGTGATGGCCCAGGACCAGAGGATCAGGTGGTACCTGCTGAGC  - 3650
ATGGGCAGCAATGAGAACATCCACAGCATCCACTTCTCTGGCCATGTGTT  - 3700
CACTGTGAGGAAGAAGGAGGAGTACAAGATGGCCCTGTACAACCTGTACC  - 3750
CTGGGGTGTTTGAGACTGTGGAGATGCTGCCCAGCAAGGCTGGCATCTGG  - 3800
AGGGTGGAGTGCCTGATTGGGGAGCACCTGCATGCTGGCATGAGCACCCT  - 3850
GTTCCTGGTGTACAGCAACAAGTGCCAGACCCCCTGGGCATGGCCTCTG  - 3900
GCCACATCAGGGACTTCCAGATCACTGCCTCTGGCCAGTATGGCCAGTGG  - 3950
GCCCCCAAGCTGGCCAGGCTGCACTACTCTGGCAGCATCAATGCCTGGAG  - 4000
CACCAAGGAGCCCTTCAGCTGGATCAAGGTGGACCTGCTGGCCCCCATGA  - 4050
TCATCCATGGCATCAAGACCCAGGGGGCCAGGCAGAAGTTCAGCAGCCTG  - 4100
TACATCAGCCAGTTCATCATCATGTACAGCCTGGATGGCAAGAAGTGGCA  - 4150
GACCTACAGGGGCAACAGCACTGGCACCCTGATGGTGTTCTTTGGCAATG  - 4200
TGGACAGCTCTGGCATCAAGCACAACATCTTCAACCCCCCCATCATTGCC  - 4250
AGATACATCAGGCTGCACCCCACCCACTACAGCATCAGGAGCACCCTGAG  - 4300
GATGGAGCTGATGGGCTGTGACCTGAACAGCTGCAGCATGCCCCTGGGCA  - 4350
TGGAGAGCAAGGCCATCTCTGATGCCCAGATCACTGCCAGCAGCTACTTC  - 4400
ACCAACATGTTTGCCACCTGGAGCCCCAGCAAGGCCAGGCTGCATCTGCA  - 4450
GGGCAGGAGCAATGCCTGGAGGCCCCAGGTCAACAACCCCAAGGAGTGGC  - 4500
TGCAGGTGGACTTCCAGAAGACCATGAAGGTGACTGGGGTGACCACCCAG  - 4550
GGGGTGAAGAGCCTGCTGACCAGCATGTATGTGAAGGAGTTCCTGATCAG  - 4600
CAGCAGCCAGGATGGCCACCAGTGGACCCTGTTCTTCCAGAATGGCAAGG  - 4650
TGAAGGTGTTCCAGGGCAACCAGGACAGCTTCACCCCTGTGGTGAACAGC  - 4700
CTGGACCCCCCCCTGCTGACCAGATACCTGAGGATTCACCCCCAGAGCTG  - 4750
GGTGCACCAGATTGCCCTGAGGATGGAGGTGCTGGGCTGTGAGGCCCAGG  - 4800
ACCTGTACTGAGGATCCAATAAAATATCTTTATTTTCATTACATCTGTGT  - 4850
GTTGGTTTTTTGTGTGTTTTCCTGTAACGATCGGGCTCGAGCGC.
```

SEQ ID NO:5 comprises (from 5' to 3') insulator (spacer) sequence Ins1 (nt 14-32 of SEQ ID NO:5), Serpin1 enhancer CRMSBS2 (nt 33-104 of SEQ ID NO:5), transthyretin minimal promoter TTRm (nt 117-339 of SEQ ID NO:5), SBR Intron3 (nt 340-432 of SEQ ID NO:5), FVIII coding sequence hF8 BDD (438-4811 of SEQ ID NO:5), SPA51 synthetic poly A sequence (nt 4818-4868 of SEQ ID NO:5), and insulator sequence Ins3 (nt 4869-4885 of SEQ ID NO:5), as described in PCT Publication No. WO 2017/074526.

Construction of recombinant AAV vectors has been described in a number of publications, including U.S. Pat. No. 5,173,414; Tratschin et al., *Mol. Cell. Biol.* 5:3251-3260 (1985); Tratschin, et al., *Mol. Cell. Biol.* 4:2072-2081 (1984); Hermonat & Muzyczka, *PNAS* 81:6466-6470 (1984); and Samulski et al., *J. Virol.* 63:03822-3828 (1989). Efficient gene transfer and stable transgene delivery due to integration into the genomes of the transduced cell are features for this vector system. See, e.g., Wagner et al., *Lancet* 351:9117 1702-3 (1998), Kearns et al., *Gene Ther.* 9:748-55 (1996).

The effective amount of the AAV vector to be administered can vary from patient to patient. In some embodiments, effective amounts are determined by the physician administering the compositions (AAV vectors). Analysis of the serum, plasma or other tissue levels of the therapeutic polypeptide and comparison to the initial level prior to administration can determine whether the amount being administered is too low, within the right range or too high. Suitable regimes for initial and subsequent administrations are also variable, but are typified by an initial administration, optionally followed by subsequent administrations if necessary. Subsequent administrations may be administered at variable intervals, ranging from daily to annually to every several years. In some embodiments, appropriate immunosuppressive techniques may be recommended to avoid inhibition or blockage of transduction by immunosuppression of the delivery vectors. See, e.g., Vilquin et al., (1995) *Human Gene Ther.*, 6:1391-1401.

Administration can be by any means. Both in vivo and ex vivo methods are contemplated. In some embodiments, intravenous injection (for example, though not limited to, via the portal vein) is the method of administration. In some embodiments, administration is through a standard intravenous administration. Other in vivo administration modes include, for example, direct injection into the lobes of the liver or the biliary duct and intravenous injection distal to the liver, including through the hepatic artery, direct injection in to the liver parenchyma, injection via the hepatic artery, and/or retrograde injection through the biliary tree. Ex vivo modes of administration include transduction in vitro of resected hepatocytes or other cells of the liver, followed by infusion of the transduced, resected hepatocytes back into the portal vasculature, liver parenchyma or biliary tree of the human patient, see e.g., Grossman et al., (1994) *Nature Genetics*, 6:335-341.

Exemplary intravenous doses of an AAV vector as described herein can in some embodiments be between $6\times10^{11}$ to $1\times10^{13}$ or $3\times10^{13}$ or $1\times10^{13}$ to $1\times10^{14}$, or $1\times10^{13}$ to $5\times10^{13}$, or $2\times10^{13}$ to $4\times10^{13}$ vg/kg, e.g., from $1\times10^{12}$ or $2\times10^{12}$ to $3\times10^{13}$, viral genomes/kilogram (vg/kg) of the human recipient. In some embodiments, the dosage is $1\times10^{11}$ to $1\times10^{12}$ vg/kg. In some embodiments, the dosage is $1\times10^{12}$ to $1\times10^{13}$ vg/kg or $3\times10^{13}$. In some embodiments, the dosage is $2\times10^{12}$ to $3\times10^{13}$. In some embodiments, the dosage is $5\times10^{12}$ to $5\times10^{13}$ vg/kg. As noted above, in some embodiments, the AAV vector is supplied to the recipient as a single dose. In some embodiments, the dosage is $6\times10^{11}$, $9\times10^{11}$, $1.2\times10^{12}$, $2\times10^{12}$, $4\times10^{12}$, $6\times10^{12}$, $1\times10^{13}$, $3\times10^{13}$, $4\times10^{13}$ or $5\times10^{13}$ vg/kg. In some embodiments, a patient receives a single dose of the AAV vector.

A pharmaceutically-acceptable carrier can be included as part of the formulation administered. Pharmaceutically acceptable carriers are determined in part by the particular composition being administered, as well as by the particular method used to administer the composition. Accordingly, there is a wide variety of suitable formulations of pharmaceutical compositions available, as described below (see, e.g., *Remington's Pharmaceutical Sciences,* 17th ed., 1989).

Formulations for both ex vivo and in vivo administrations can include suspensions (e.g., of genetically modified cells, liposomes or nanoparticles) in liquid or emulsified liquids. The active ingredients can be mixed with excipients that are pharmaceutically acceptable and compatible with the active ingredient. Suitable excipients include, for example, water, saline, dextrose, glycerol, ethanol or the like, and combinations thereof. In addition, the composition may contain minor amounts of auxiliary substances, such as, wetting or emulsifying agents, pH buffering agents, stabilizing agents or other reagents that enhance the effectiveness of the pharmaceutical composition.

Subjects receiving the described AAV vector can be any human. Exemplary recipients include for example individuals having hemophilia (for example hemophilia A). In some embodiments, a therapeutically effective amount, in reference to the treatment of hemophilia A or for use in a method for reducing bleeding time during a bleeding episode in a subject suffering from hemophilia A, refers to an amount capable of invoking one or more of the following effects: (1) reduction, inhibition, or prevention, to some extent, of one or more of the physiological symptoms of hemophilia A including, for example, bruising, joint pain or swelling, prolonged headache, vomiting or fatigue, (2) improvement in the capability to clot blood, (3) reduction of overall bleeding time during a bleeding episode, (4) administration resulting in a measurable increase in the concentration or activity of functional FVIII protein in the plasma of a subject, and/or (5) relief, to some extent, of one or more symptoms associated with the disorder.

In some embodiments, a FVIII blood concentration that is greater than 1% of factor concentration found in a normal individual results from administration of the AAV vector as described herein, thereby changing a severe disease phenotype to a moderate one. A severe phenotype is characterized by joint damage and life-threatening bleeds. In some embodiments, administration of the AAV vector as described herein results in a FVIII blood concentration of at least 5% of normal. In some embodiments, to convert a moderate disease phenotype into a mild one a FVIII blood concentration greater than 5% of normal is needed. FVIII levels in normal humans are about 1.14+−0.48 nM plasma, for example, by an activated partial thromboplastin time (aPTT) one-stage clotting assay (see, e.g., Butenas, et al., *Thromb Res.* (2010 August); 126(2): 119-123). Thus, a therapeutic effect can be achieved by expression of FVIII such that the total amount of FVIII in the subject/human is greater than 1% of the FVIII present in normal subjects/humans, e.g., 1% of 1.14+−0.48 nM.

In some embodiments, prior to the administrating the human had less than 1%, 2%, 3%, 4%, or 5% of normal human circulating FVIII activity and within 2, 4, 6, 8, 10, 12, 16, 20, 24, 28, 32, 36, 40, 44, 48, or 52 weeks after the administrating the human has at least 1%, 2%, 3%, 4%, or 5%, respectively, of normal human circulating FVIII activity In some embodiments, administration of an AAV vector as described herein results in an increase in functional FVIII protein activity in the plasma of the human recipient of at least 1, 2, 3, 4, 5, 6, 7, 8, 9, 10, 11, 12, 13, 14, 15, or more IU/dl as compared to the amount of functional FVIII protein activity present in the plasma in the subject prior (e.g., within 14 days before administration) to administration. In some embodiments, administration of an AAV vector as described herein results in the expression of at least about 1, 2, 3, 4, 5, 6, 7, 8, 9, 10 or more IU/dl of circulating FVIII activity in the plasma of the subject. In this regard, the term "IU" or "international unit" in regards to FVIII activity is a commonly-understood term, wherein 1 IU of FVIII activity is equivalent to the quantity of FVIII in one ml of normal human plasma. In some embodiments, normal human FVIII activity is 0.500-1.500 IU/ml plasma. The World Health Organization describes levels of severity of hemophilia as follows:

| Level | Percentage of normal factor activity in bloo Percentage of normal factor activity in blood | Number of international units (IU) per milliliter (ml) of whole blood |
|---|---|---|
| normal range | 50%-150% | 0.50-1.5 IU |
| mild hemophilia | 5%-40% | 0.05-0.40 IU |
| moderate hemophilia | 1%-5% | 0.01-0.05 IU |
| severe hemophilia | less than 1% | less than 0.01 IU |

FVIII activity in the plasma may be quantitatively determined by a number of well-known and accepted assays including, for example, the activated partial thromboplastin time (APPT) method (see, e.g., Miletich J P: Activated partial thromboplastin time. In Williams Hematology. Fifth edition. Edited by E Beutler, M A Lichtman, B A Coller, T J Kipps. New York, McGraw-Hill, 1995, pp L85-86, Greaves and Preston, Approach to the bleeding patient. *In Hemostasis and Thrombosis: Basic Principles and Clinical Practice*. Fourth edition. Edited by R W Colman, J Hirsh, V J Marder, et al. Philadelphia, JB Lippincott Co, 2001, pp 1197-1234 and Olson et al, *Arch. Pathol. Lab. Med.* 122: 782-798 (1998)) or chromogenic FXa assay (Harris et al., *Thromb. Res.* 128(6): 125-129 (2011)).

In other embodiments, bleeding time in a subject may be measured by well-known and accepted techniques including, for example, the Ivy method (see, e.g., Ivy et al., *Surg. Gynec. Obstet.* 60:781 (1935) and Ivy et al., *J. Lab. Clin. Med.* 26: 1812 (1941)) or the Duke method (see, e.g., Duke et al., *JAMA* 55: 1185 (1910)). A "bleeding episode" in a subject refers to an injury that results in bleeding in the subject, either externally or internally, and generally comprises the time period from injury to formation of a blood clot. In some embodiments, the frequency of bleeding episodes is reduced in a subject after the administering of the AAV vectors described herein. In some embodiments, the frequency of bleeding episodes is reduced 10%, 15%, 20%, 25%, 30%, 35%, 40%, 45%, 50%, 55%, 60%, 65%, 70%, 75%, 80%, 85%, 90%, 95%, or 100% after the administering.

In some embodiments, the concentration of FVIII protein in blood of the human is measured before, after, or before and after the administrating. Direct or indirect assays for measuring FVIII blood concentration can be used. Exemplary indirect methods include for example those described in Over, J. (1986) *Scand. J Haematol.* 33 (Suool. 41), 13-24; Kemball-Cook, G., et al. (1993) *Brit. J. Haematol.* 84, 273-278. Direct detection methods include those described in, e.g., U.S. Pat. No. 8,715,951. In some embodiments, the FVIII blood concentration is determined within two weeks before the initial administration of the AAV vector to best determine the effect after administration.

In some embodiments, administration and treatment with the AAV vectors described herein will cause a reduction in the need for treatment with replacement Factor VIII protein by the subject. This can be measured by noting the frequency of need for treatment prior to administration of the AAV vectors described herein, and then noting the frequency of need for treatment after administering. In some embodiments, the reduction in need for treatment is 10%, 15%, 20%, 25%, 30%, 35%, 40%, 45%, 50%, 55%, 60%, 65%, 70%, 75%, 80%, 85%, 90%, 95%, or 100% reduced after the administering.

In some embodiments, administration and treatment with the AAV vectors described herein cause little or no harm to the liver. Liver status can be measured, for example, by measuring one or more markers in the blood of the individual. Exemplary markers indicative of liver health include but are not limited to Alanine aminotransferase (ALT) or aspartate aminotransferase (AST)) bilirubin, alkaline phosphatase, and albumin. In some embodiments, the human displays no more than 1.0, 1.2, 1.5, 1.7, or 2.0 times upper limit of normal (ULN) of at least one of alanine aminotransferase (ALT), aspartate aminotransferase (AST), bilirubin, alkaline phosphatase, or albumin within 2, 4, 6, 8, 10, 12, 16, 20, 24, 28, 32, 36, 40, 44, 48, or 52 weeks of the administering. The ULN can generally be determined from a population. See, e.g., Neuschwander-Tetri, B., et al., *Arch Intern Med.* 2004 Mar. 24; 168(6): 663-666 discussing for ALT. In some embodiments, the ULN for ALT is 44 U/L. In some embodiments, the ULN for AST is 39 U/L. In some embodiments, the ULN for bilirubin is 0.1-1.0 mg/dl for total bilirubin 0.2-0.7 mg/dl for conjugated bilirubin and 0.1-0.4 mg/dl for unconjugated bilirubin. See, e.g., Lisa B, Van-Wagner (2015). *Journal of American Medical Association* (*JAMA*) 313 (5): 516-517. In some embodiments, the ULN for alkaline phosphatase is 129 or 133 U/L. See, e.g., Gowda, et al., *Pan Afr Med J.* (2009) 3:17. In some embodiments, the normal range for albumin is 35-55 g/liter (Burtis and Ashwood (1999) *Tietz Textbook of Clinical Chemistry*, 3$^{rd}$ edition. Saunders Editor).

In some embodiments, administration and treatment with the AAV vectors described herein do not result in detectable levels of FVIII inhibitor, for example at any one or more of time points: 4, 8, 12, 16, 20, 24, 28, 32, 36, 40, 44, 48, or 52 weeks after the administrating. FVIII inhibitors are detected by the Nijmegen-Bethesda assay (Duncan, et al., *Methods Mol Biol.* 2013; 992:321-33 and Miller C H, et al. *Am J Hematol.* 90:871-876 (2015)). The limit of detection of this assay is 0.6 BU. Any result under 0.6 BU is considered undetectable.

In some embodiments, administration and treatment with the AAV vectors described herein do not significantly affect expression of certain biomarkers and ideally result in improved results for the biomarkers. Exemplary biomarkers include, e.g., Von Willebrand factor (vWF), soluble epidermal growth factor receptor (sEGFR), Galectin-3-binding protein (GAL3BP), C-reactive protein (CRP), IL-6, circulating alpha fetoprotein. In some embodiments, one or more of the above-listed biomarkers are measured in the individual's blood prior to or after administration or both. In some embodiments, the blood level of one or more of the biomarkers when assayed within 2, 4, 6, 8, 10, 12, 16, 20, 24, 28, 32, 36, 40, 44, 48, or 52 weeks after the administering is no more than 1.0, 1.2, 1.5, 1.7, or 2.0 times a level within two weeks prior to the administering.

General

Practice of the methods, as well as preparation and use of the compositions disclosed herein employ, unless otherwise indicated, conventional techniques in molecular biology, biochemistry, chromatin structure and analysis, computational chemistry, cell culture, recombinant DNA and related fields as are within the skill of the art. These techniques are fully explained in the literature. See, for example, Sambrook et al. MOLECULAR CLONING: A LABORATORY MANUAL, Second edition, Cold Spring Harbor Laboratory Press, 1989 and Third edition, 2001; Ausubel et al., CURRENT PROTOCOLS IN MOLECULAR BIOLOGY, John Wiley & Sons, New York, 1987 and periodic updates; the series METHODS IN ENZYMOLOGY, Academic Press, San Diego; Wolfe, CHROMATIN STRUCTURE AND FUNCTION, Third edition, Academic Press, San Diego, 1998; METHODS IN ENZYMOLOGY, Vol. 304, "Chromatin" (P. M. Wassarman and A. P. Wolffe, eds.), Academic Press, San Diego, 1999; and METHODS IN MOLECULAR BIOLOGY, Vol. 119, "Chromatin Protocols" (P. B. Becker, ed.) Humana Press, Totowa, 1999.

Definitions

The terms "nucleic acid," "polynucleotide," and "oligonucleotide" are used interchangeably and refer to a deoxyribonucleotide or ribonucleotide polymer, in linear or circular conformation, and in either single- or double-stranded form. For the purposes of the present disclosure, these terms are not to be construed as limiting with respect to the length of a polymer. The terms can encompass known analogues of natural nucleotides, as well as nucleotides that are modified in the base, sugar and/or phosphate moieties (e.g., phosphorothioate backbones). In general, an analogue of a particular nucleotide has the same base-pairing specificity; i.e., an analogue of A will base-pair with T.

The terms "polypeptide," "peptide" and "protein" are used interchangeably to refer to a polymer of amino acid residues. The term also applies to amino acid polymers in which one or more amino acids are chemical analogues or modified derivatives of a corresponding naturally-occurring amino acids.

In any of the methods described herein, the exogenous nucleotide sequence (the "expression construct" or "expression cassette" or "vector") can contain sequences that are homologous, but not identical, to genomic sequences in the region of interest, thereby stimulating homologous recombination to insert a non-identical sequence in the region of interest. Thus, in certain embodiments, portions of the expression cassette sequence that are homologous to sequences in the region of interest exhibit between about 80 to 99% (or any integer therebetween) sequence identity to the genomic sequence that is replaced. In other embodiments, the homology between the expression cassette and genomic sequence is higher than 99%, for example if only 1 nucleotide differs as between the homology regions of the expression cassette and genomic sequences of over 100 contiguous base pairs. In certain cases, a non-homologous portion of the expression cassette can contain sequences not present in the region of interest, such that new sequences are introduced into the region of interest. In these instances, the non-homologous sequence is generally flanked by sequences of 50-1,000 base pairs (or any integral value therebetween) or any number of base pairs greater than 1,000, that are homologous or identical to sequences in the region of interest.

The term "sequence" refers to a nucleotide sequence of any length, which can be DNA or RNA; can be linear, circular or branched and can be either single-stranded or double stranded. The term "transgene" refers to a nucleotide sequence that is inserted into a genome. A transgene can be of any length, for example between 2 and 100,000,000 nucleotides in length (or any integer value therebetween or thereabove), preferably between about 100 and 100,000 nucleotides in length (or any integer therebetween), more preferably between about 2000 and 20,000 nucleotides in length (or any value therebetween) and even more preferable, between about 5 and 15 kb (or any value therebetween).

A "chromosome," is a chromatin complex comprising all or a portion of the genome of a cell. The genome of a cell is often characterized by its karyotype, which is the collection of all the chromosomes that comprise the genome of the cell. The genome of a cell can comprise one or more chromosomes.

An "episome" is a replicating nucleic acid, nucleoprotein complex or other structure comprising a nucleic acid that is not part of the chromosomal karyotype of a cell. Examples of episomes include plasmids and certain viral genomes. The liver specific constructs described herein may be epiosomally maintained or, alternatively, may be stably integrated into the cell.

An "exogenous" molecule is a molecule that is not normally present in a cell, but can be introduced into a cell by one or more genetic, biochemical or other methods. "Normal presence in the cell" is determined with respect to the particular developmental stage and environmental conditions of the cell. Thus, for example, a molecule that is present only during embryonic development of muscle is an exogenous molecule with respect to an adult muscle cell. Similarly, a molecule induced by heat shock is an exogenous molecule with respect to a non-heat-shocked cell. An exogenous molecule can comprise, for example, a functioning version of a malfunctioning endogenous molecule or a malfunctioning version of a normally-functioning endogenous molecule.

An exogenous molecule can be, among other things, a small molecule, such as is generated by a combinatorial chemistry process, or a macromolecule such as a protein, nucleic acid, carbohydrate, lipid, glycoprotein, lipoprotein, polysaccharide, any modified derivative of the above molecules, or any complex comprising one or more of the above molecules. Nucleic acids include DNA and RNA, can be single- or double-stranded; can be linear, branched or circular; and can be of any length. Nucleic acids include those capable of forming duplexes, as well as triplex-forming nucleic acids. See, for example, U.S. Pat. Nos. 5,176,996 and 5,422,251. Proteins include, but are not limited to, DNA-binding proteins, transcription factors, chromatin remodeling factors, methylated DNA binding proteins, polymerases, methylases, demethylases, acetylases, deacetylases, kinases, phosphatases, ligases, deubiquitinases, integrases, recombinases, ligases, topoisomerases, gyrases and helicases.

An exogenous molecule can be the same type of molecule as an endogenous molecule, e.g., an exogenous protein or nucleic acid. For example, an exogenous nucleic acid can comprise an infecting viral genome, a plasmid or episome introduced into a cell, or a chromosome that is not normally present in the cell. Methods for the introduction of exogenous molecules into cells are known to those of skill in the art and include, but are not limited to, lipid-mediated transfer (i.e., liposomes, including neutral and cationic lipids), electroporation, direct injection, cell fusion, particle bombardment, calcium phosphate co-precipitation, DEAE-dextran-mediated transfer and viral vector-mediated transfer. An exogenous molecule can also be the same type of molecule as an endogenous molecule but derived from a different species than the cell is derived from. For example, a human nucleic acid sequence may be introduced into a cell line originally derived from a mouse or hamster. Methods for the introduction of exogenous molecules into plant cells are known to those of skill in the art and include, but are not limited to, protoplast transformation, silicon carbide (e.g., WHISKERS™), *Agrobacterium*-mediated transformation, lipid-mediated transfer (i.e., liposomes, including neutral and cationic lipids), electroporation, direct injection, cell fusion, particle bombardment (e.g., using a "gene gun"), calcium phosphate co-precipitation, DEAE-dextran-mediated transfer and viral vector-mediated transfer.

By contrast, an "endogenous" molecule is one that is normally present in a particular cell at a particular developmental stage under particular environmental conditions. For example, an endogenous nucleic acid can comprise a chromosome, the genome of a mitochondrion, chloroplast or other organelle, or a naturally-occurring episomal nucleic acid. Additional endogenous molecules can include proteins, for example, transcription factors and enzymes.

As used herein, the term "product of an exogenous nucleic acid" includes both polynucleotide and polypeptide products, for example, transcription products (polynucleotides such as RNA) and translation products (polypeptides).

A "gene," for the purposes of the present disclosure, includes a DNA region encoding a gene product (see infra), as well as all DNA regions which regulate the production of the gene product, whether or not such regulatory sequences are adjacent to coding and/or transcribed sequences. Accordingly, a gene includes, but is not necessarily limited to, promoter sequences, terminators, translational regulatory sequences such as ribosome binding sites and internal ribosome entry sites, enhancers, silencers, insulators, boundary elements, replication origins, matrix attachment sites and locus control regions.

"Gene expression" refers to the conversion of the information, contained in a gene, into a gene product. A gene product can be the direct transcriptional product of a gene (e.g., mRNA, tRNA, rRNA, antisense RNA, ribozyme, structural RNA or any other type of RNA) or a protein produced by translation of an mRNA. Gene products also include RNAs which are modified, by processes such as capping, polyadenylation, methylation, and editing, and proteins modified by, for example, methylation, acetylation, phosphorylation, ubiquitination, ADP-ribosylation, myristilation, and glycosylation.

"Modulation" of gene expression refers to a change in the activity of a gene. Modulation of expression can include, but is not limited to, gene activation and gene repression. Genome editing (e.g., cleavage, alteration, inactivation, random mutation) can be used to modulate expression. Gene inactivation refers to any reduction in gene expression as compared to a cell that does not include a ZFP, TALE or CRISPR/Cas system as described herein. Thus, gene inactivation may be partial or complete.

"Eukaryotic" cells include, but are not limited to, fungal cells (such as yeast), plant cells, animal cells, mammalian cells and human cells (e.g., T-cells), including stem cells (pluripotent and multipotent).

The terms "operative linkage" and "operatively linked" (or "operably linked") are used interchangeably with reference to a juxtaposition of two or more components (such as sequence elements), in which the components are arranged such that both components function normally and allow the possibility that at least one of the components can mediate a function that is exerted upon at least one of the other components. By way of illustration, a transcriptional regulatory sequence, such as a promoter, is operatively linked to a coding sequence if the transcriptional regulatory sequence controls the level of transcription of the coding sequence in response to the presence or absence of one or more transcriptional regulatory factors. A transcriptional regulatory sequence is generally operatively linked in cis with a coding sequence, but need not be directly adjacent to it. For example, an enhancer is a transcriptional regulatory sequence that is operatively linked to a coding sequence, even though they are not contiguous.

A "functional fragment" of a protein, polypeptide or nucleic acid is a protein, polypeptide or nucleic acid whose sequence is not identical to the full-length protein, polypeptide or nucleic acid, yet retains the same function as the full-length protein, polypeptide or nucleic acid. A functional fragment can possess more, fewer, or the same number of residues as the corresponding native molecule, and/or can contain one or more amino acid or nucleotide substitutions. Methods for determining the function of a nucleic acid (e.g., coding function, ability to hybridize to another nucleic acid) are well-known in the art. Similarly, methods for determining protein function are well-known. For example, the B-domain deleted human Factor VIII is a functional fragment of the full-length Factor VIII protein.

A polynucleotide "vector" or "construct" is capable of transferring gene sequences to target cells. Typically, "vector construct," "expression vector," "expression construct," "expression cassette," and "gene transfer vector," mean any nucleic acid construct capable of directing the expression of a gene of interest and which can transfer gene sequences to target cells. Thus, the term includes cloning, and expression vehicles, as well as integrating vectors.

The terms "subject" and "patient" are used interchangeably and refer to mammals such as human patients and non-human primates, as well as experimental animals such as rabbits, dogs, cats, rats, mice, and other animals. Accordingly, the term "subject" or "patient" as used herein means any mammalian patient or subject to which the expression cassettes of the invention can be administered. Subjects of the present invention include those with a disorder.

The terms "treating" and "treatment" as used herein refer to reduction in severity and/or frequency of symptoms, elimination of symptoms and/or underlying cause, prevention of the occurrence of symptoms and/or their underlying cause, and improvement or remediation of damage. Cancer and graft versus host disease are non-limiting examples of conditions that may be treated using the compositions and methods described herein. Thus, "treating" and "treatment" includes:

(i) preventing the disease or condition from occurring in a mammal, in particular, when such mammal is predisposed to the condition but has not yet been diagnosed as having it;

(ii) inhibiting the disease or condition, i.e., arresting its development;

(iii) relieving the disease or condition, i.e., causing regression of the disease or condition; and/or (iv) relieving or eliminating the symptoms resulting from the disease or condition, i.e., relieving pain with or without addressing the underlying disease or condition.

As used herein, the terms "disease" and "condition" may be used interchangeably or may be different in that the particular malady or condition may not have a known causative agent (so that etiology has not yet been worked out) and it is therefore not yet recognized as a disease but only as an undesirable condition or syndrome, wherein a more or less specific set of symptoms have been identified by clinicians.

A "pharmaceutical composition" refers to a formulation of a compound of the invention and a medium generally accepted in the art for the delivery of the biologically active compound to mammals, e.g., humans. Such a medium includes all pharmaceutically acceptable carriers, diluents or excipients therefor.

"Effective amount" or "therapeutically effective amount" refers to that amount of a compound of the invention which, when administered to a mammal, preferably a human, is sufficient to effect treatment in the mammal, preferably a human. The amount of a composition of the invention which constitutes a "therapeutically effective amount" will vary depending on the compound, the condition and its severity, the manner of administration, and the age of the mammal to be treated, but can be determined routinely by one of ordinary skill in the art having regard to his own knowledge and to this disclosure.

Liver-Specific Expression Constructs

Also described herein are expression cassettes (constructs) for use in directing expression of a transgene in a liver cell, including in vivo following administration of the expression cassette(s) to the subject (e.g., hepatic delivery). The expression construct may be maintained episomally and drive expression of the transgene extrachromosomally or, alternatively, the expression construct may be integrated into the genome of a liver cell, for example by nuclease-mediated targeted integration.

The polynucleotide expression construct comprises an enhancer sequence, a promoter sequence, and one or more transgenes. Optionally included are one or more of the following: an intronic sequence, a polyadenylation sequence and/or a signal peptide. Any enhancer sequence may be used in the expression constructs described herein. In certain embodiments, the enhancer is a wild-type or modified Serpin1 enhancer (Chuah et al., (2014) *Molecular Therapy,* 22, 1605-1613; Nair et al., (2014) *Blood,* 123, 3195-3199)

As will be apparent, any transgene can be used in the constructs described herein. Furthermore, the individual components (promoter, enhancer, insulator, transgene, etc.) of the constructs described herein may be mixed and matched in any combination.

The constructs described herein may be contained within any viral or non-viral vector. The constructs may be maintained episomally or may be integrated into the genome of the cell (e.g., via nuclease-mediated targeted integration).

Non-viral vectors include DNA or RNA plasmids, DNA MCs, naked nucleic acid, and nucleic acid complexed with a delivery vehicle such as a liposome, nanoparticle or poloxamer. Viral vectors that may be used to carry the expression cassettes described herein include, but are not limited to, retroviral, lentivirus, adenoviral, adeno-associated viral vectors, vaccinia and herpes simplex virus vectors. Integration in the host genome is possible with the retrovirus, lentivirus, and adeno-associated virus gene transfer methods, and as described herein may be facilitated by nuclease-mediated integration.

In certain embodiments, the constructs are included in an adeno-associated virus ("AAV") vector or vector system that may be maintained episomally or integrated into the genome of a liver cell (e.g., via nuclease-mediated targeted integration). Construction of recombinant AAV vectors is in a number of publications, including U.S. Pat. No. 5,173,414; Tratschin et al., *Mol. Cell. Biol.* 5:3251-3260 (1985); Tratschin, et al., *Mol. Cell. Biol.* 4:2072-2081 (1984); *Hermonat & Muzyczka, PNAS* 81:6466-6470 (1984); and Samulski et al., *J. Virol.* 63:03822-3828 (1989).

Thus, in certain embodiments, the expression construct is carried on an AAV construct and further comprises 5' and 3' ITRs flanking the expression constructs elements (e.g., enhancer, promoter, optional intron, transgene, etc.) as described herein. Optionally, spacer molecules are also included between one or more of the components of the expression construct, for example, between the 5' ITR and the enhancer and/or between the polyadenylation signal and the 3' ITR. The spacers may function as homology arms to facilitate recombination into a safe-harbor locus (e.g. albumin).

In certain embodiments, the AAV vectors as described herein can be derived from any AAV. In certain embodiments, the AAV vector is derived from the defective and nonpathogenic parvovirus adeno-associated type 2 virus. All such vectors are derived from a plasmid that retains only the AAV 145 bp inverted terminal repeats flanking the transgene expression cassette. Efficient gene transfer and stable transgene delivery due to integration into the genomes of the transduced cell are key features for this vector system. (Wagner et al., *Lancet* 351:9117 1702-3 (1998), Kearns et al., *Gene Ther.* 9:748-55 (1996)). Other AAV serotypes, including AAV1, AAV2, AAV3, AAV4, AAV5, AAV6, AAV7, AAV8, AAV9 and AAVrh.10 and any novel AAV serotype can also be used in accordance with the present invention. In some embodiments, chimeric AAV is used where the viral origins of the LTR sequences of the viral nucleic acid are heterologous to the viral origin of the capsid sequences. Non-limiting examples include chimeric virus with LTRs derived from AAV2 and capsids derived from AAV5, AAV6, AAV8 or AAV9 (i.e. AAV2/5, AAV2/6, AAV2/8 and AAV2/9, respectively).

Packaging cells are used to form virus particles that are capable of infecting a host cell. Such cells include HEK293 and Sf9 cells, which can be used to package AAV and adenovirus, and ψ2 cells or PA317 cells, which package retrovirus. Viral vectors used in gene therapy are usually generated by a producer cell line that packages a nucleic acid vector into a viral particle. The vectors typically contain the minimal viral sequences required for packaging and subsequent integration into a host (if applicable), other viral sequences being replaced by an expression cassette encoding the protein to be expressed. The missing viral functions are supplied in trans by the packaging cell line. For example, AAV vectors used in gene therapy typically only possess inverted terminal repeat (ITR) sequences from the AAV genome which are required for packaging and integration into the host genome. Viral DNA is packaged in a cell line, which contains a helper plasmid encoding the other AAV genes, namely rep and cap, but lacking ITR sequences. The cell line is also infected with adenovirus as a helper. The helper virus promotes replication of the AAV vector and expression of AAV genes from the helper plasmid. The helper plasmid is not packaged in significant amounts due to a lack of ITR sequences. Contamination with adenovirus can be reduced by, e.g., heat treatment to which adenovirus is more sensitive than AAV. In some embodiments, AAV is produced using a baculovirus expression system.

In many gene therapy applications, it is desirable that the gene therapy vector be delivered with a high degree of specificity to a particular tissue type. Accordingly, a viral vector can be modified to have specificity for a given cell type by expressing a ligand as a fusion protein with a viral coat protein on the outer surface of the virus. The ligand is chosen to have affinity for a receptor known to be present on the cell type of interest. For example, Han et al., *Proc. Natl. Acad. Sci. USA* 92:9747-9751 (1995), reported that Moloney murine leukemia virus can be modified to express human heregulin fused to gp70, and the recombinant virus infects certain human breast cancer cells expressing human epidermal growth factor receptor. This principle can be extended to other virus-target cell pairs, in which the target cell expresses a receptor and the virus expresses a fusion protein comprising a ligand for the cell-surface receptor. For example, filamentous phage can be engineered to display antibody fragments (e.g., FAB or Fv) having specific binding affinity for virtually any chosen cellular receptor. Although the above description applies primarily to viral vectors, the same principles can be applied to nonviral vectors. Such vectors can be engineered to contain specific uptake sequences which favor uptake by specific target cells.

The polynucleotides described herein may include one or more non-natural bases and/or backbones. In particular, an expression cassette as described herein may include methylated cytosines to achieve a state of transcriptional quiescence in a region of interest.

Furthermore, the expression constructs as described herein may also include additional transcriptional or translational regulatory or other sequences, for example, Kozak sequences, additional promoters, enhancers, insulators, internal ribosome entry sites, sequences encoding 2A peptides, furin cleavage sites and/or polyadenylation signals. Further, the control elements of the genes of interest can be operably linked to reporter genes to create chimeric genes (e.g., reporter expression cassettes).

Delivery

The constructs described herein may be delivered in vivo or ex vivo by any suitable means into any cell type, preferably to the liver (hepatic delivery). Similarly, when used in combination with nucleases for targeted integration, the nucleases may be delivered in polynucleotide and/or protein form, for example using non-viral vector(s), viral vectors(s) and/or in RNA form, e.g., as mRNA.

Conventional viral and non-viral based gene transfer methods can be used to introduce nucleic acids encoding engineered gene modulators in cells (e.g., mammalian cells) and target tissues. Such methods can also be used to administer nucleic acids encoding such repressors (or components thereof) to cells in vitro. In certain embodiments, nucleic acids encoding the repressors are administered for in vivo or ex vivo gene therapy uses. Non-viral vector delivery systems include DNA plasmids, naked nucleic acid, and nucleic acid complexed with a delivery vehicle such as a liposome or poloxamer. Viral vector delivery systems include DNA and RNA viruses, which have either episomal or integrated genomes after delivery to the cell. For a review of gene therapy procedures, see Anderson, *Science* 256:808-813 (1992); Nabel & Felgner, *TIBTECH* 11:211-217 (1993); Mitani & Caskey, *TIBTECH* 11:162-166 (1993); Dillon, *TIBTECH* 11:167-175 (1993); Miller, *Nature* 357:455-460 (1992); Van Brunt, *Biotechnology* 6(10):1149-1154 (1988); Vigne, *Restorative Neurology and Neuroscience* 8:35-36 (1995); Kremer & Perricaudet, *British Medical Bulletin* 51(1):31-44 (1995); Haddada et al., in *Current Topics in Microbiology and Immunology* Doerfler and Bohm (eds.) (1995); and Yu et al., *Gene Therapy* 1:13-26 (1994).

Any vector systems may be used including, but not limited to, plasmid vectors, retroviral vectors, lentiviral vectors, adenovirus vectors, poxvirus vectors; herpesvirus vectors and adeno-associated virus vectors, etc. See, also, U.S. Pat. Nos. 8,586,526; 6,534,261; 6,607,882; 6,824,978; 6,933,113; 6,979,539; 7,013,219; and 7,163,824, incorporated by reference herein in their entireties.

Methods of non-viral delivery of nucleic acids include electroporation, lipofection, microinjection, biolistics, virosomes, liposomes, immunoliposomes, other nanoparticle, polycation or lipid:nucleic acid conjugates, naked DNA, artificial virions, and agent-enhanced uptake of DNA. Sonoporation using, e.g., the Sonitron 2000 system (RichMar) can also be used for delivery of nucleic acids. Additional exemplary nucleic acid delivery systems include those provided by AmaxaBiosystems (Cologne, Germany), Maxcyte, Inc. (Rockville, Maryland), BTX Molecular Delivery Systems (Holliston, MA) and Copernicus Therapeutics Inc., (see for example U.S. Pat. No. 6,008,336).

In some embodiments, the expression constructs are AAV vectors. The optional nucleases may be administered in mRNA form or using one or more viral vectors (AAV, Ad, etc.). Administration can be by any means in which the polynucleotides are delivered to the desired target cells. Both in vivo and ex vivo methods are contemplated. Intravenous injection to the portal vein is a possible method of administration. Other in vivo administration modes include, for example, direct injection into the lobes of the liver or the biliary duct and intravenous injection distal to the liver, including through the hepatic artery, direct injection in to the liver parenchyma, injection via the hepatic artery, and/or retrograde injection through the biliary tree. Ex vivo modes of administration include transduction in vitro of resected hepatocytes or other cells of the liver, followed by infusion of the transduced, resected hepatocytes back into the portal vasculature, liver parenchyma or biliary tree of the human patient, see e.g., Grossman et al., (1994) *Nature Genetics*, 6:335-341.

In systems involving delivery of more than one polynucleotides (e.g., construct as described herein and nuclease in polynucleotide form), the two or more polynucleotide(s) are delivered using one or more of the same and/or different vectors. For example, the nuclease in polynucleotide form may be delivered in mRNA form and the liver-specific constructs as described herein may be delivered via other modalities such as viral vectors (e.g., AAV), minicircle DNA, plasmid DNA, linear DNA, liposomes, nanoparticles and the like.

Additional exemplary nucleic acid delivery systems include those provided by Amaxa Biosystems (Cologne, Germany), Maxcyte, Inc. (Rockville, Maryland), BTX Molecular Delivery Systems (Holliston, MA) and Copernicus Therapeutics Inc, (see for example U.S. Pat. No. 6,008, 336). Lipofection is described in e.g., U.S. Pat. Nos. 5,049, 386; 4,946,787; and 4,897,355) and lipofection reagents are sold commercially (e.g., Transfectam® and Lipofectin® and Lipofectamine® RNAiMAX). Cationic and neutral lipids that are suitable for efficient receptor-recognition lipofection of polynucleotides include those of Felgner, WO 91/17424, WO 91/16024. Delivery can be to cells (ex vivo administration) or target tissues (in vivo administration).

The preparation of lipid:nucleic acid complexes, including targeted liposomes such as immunolipid complexes, is well known to one of skill in the art (see, e.g., Crystal, *Science* 270:404-410 (1995); Blaese et al., *Cancer Gene Ther.* 2:291-297 (1995); Behr et al., *Bioconjugate Chem.* 5:382-389 (1994); Remy et al., *Bioconjugate Chem.* 5:647-654 (1994); Gao et al., *Gene Therapy* 2:710-722 (1995); Ahmad et al., *Cancer Res.* 52:4817-4820 (1992); U.S. Pat. Nos. 4,186,183, 4,217,344, 4,235,871, 4,261,975, 4,485, 054, 4,501,728, 4,774,085, 4,837,028, and 4,946,787).

Additional methods of delivery include the use of packaging the nucleic acids to be delivered into EnGeneIC delivery vehicles (EDVs). These EDVs are specifically delivered to target tissues using bispecific antibodies where one arm of the antibody has specificity for the target tissue and the other has specificity for the EDV. The antibody brings the EDVs to the target cell surface and then the EDV is brought into the cell by endocytosis. Once in the cell, the contents are released (see MacDiarmid et al (2009) Nature Biotechnology 27(7):643).

In applications in which transient expression is desired, adenoviral based systems can be used. Adenoviral based vectors are capable of very high transduction efficiency in many cell types and do not require cell division. With such vectors, high titer and high levels of expression have been obtained. This vector can be produced in large quantities in a relatively simple system. Adeno-associated virus ("AAV") vectors are also used to transduce cells with target nucleic acids, e.g., in the in vitro production of nucleic acids and peptides, and for in vivo and ex vivo gene therapy procedures (see, e.g., West et al., *Virology* 160:38-47 (1987); U.S. Pat. No. 4,797,368; WO 93/24641; Kotin, *Human Gene Therapy* 5:793-801 (1994); Muzyczka, *J. Clin. Invest.* 94:1351 (1994). Construction of recombinant AAV vectors are described in a number of publications, including U.S. Pat. No. 5,173,414; Tratschin et al., *Mol. Cell. Biol.* 5:3251-3260 (1985); Tratschin, et al., *Mol. Cell. Biol.* 4:2072-2081 (1984); Hermonat & Muzyczka, *PNAS* 81:6466-6470 (1984); and Samulski et al., *J. Virol.* 63:03822-3828 (1989).

Recombinant adeno-associated virus vectors (rAAV) are a promising alternative gene delivery systems based on the defective and nonpathogenic parvovirus adeno-associated type 2 virus. All vectors are derived from a plasmid that retains only the AAV 145 bp inverted terminal repeats flanking the transgene expression cassette. Efficient gene transfer and stable transgene delivery due to integration into the genomes of the transduced cell are key features for this vector system. (Wagner et al., *Lancet* 351:9117 1702-3 (1998), Kearns et al., *Gene Ther.* 9:748-55 (1996)). Other AAV serotypes, including AAV1, AAV2, AAV3, AAV4, AAV5, AAV6, AAV8AAV 8.2, AAV9, and AAV rh10 and pseudotyped AAV such as AAV2/8, AAV2/9, AAV2/5 and AAV2/6 can also be used in accordance with the present invention. Novel AAV serotypes capable of crossing the blood-brain barrier can also be used in accordance with the present invention (see e.g. US20150079038). In some embodiments, AAV6 is used.

Packaging cells are used to form virus particles that are capable of infecting a host cell. Such cells include 293 cells, which package adenovirus, and ψ2 cells or PA317 cells, which package retrovirus. Viral vectors used in gene therapy are usually generated by a producer cell line that packages a nucleic acid vector into a viral particle. The vectors typically contain the minimal viral sequences required for packaging and subsequent integration into a host (if applicable), other viral sequences being replaced by an expression cassette encoding the protein to be expressed. The missing viral functions are supplied in trans by the packaging cell line. For example, AAV vectors used in gene therapy typically only possess inverted terminal repeat (ITR) sequences from the AAV genome which are required for packaging and integration into the host genome. Viral DNA is packaged in a cell line, which contains a helper plasmid encoding the other AAV genes, namely rep and cap, but lacking ITR sequences. The cell line is also infected with adenovirus as a helper. The helper virus promotes replication of the AAV vector and expression of AAV genes from the helper plasmid. The helper plasmid is not packaged in significant amounts due to a lack of ITR sequences. Contamination with adenovirus can be reduced by, e.g., heat treatment to which adenovirus is more sensitive than AAV.

Purification of AAV particles from a 293 or baculovirus system typically involves growth of the cells which produce the virus, followed by collection of the viral particles from the cell supernatant or lysing the cells and collecting the virus from the crude lysate. AAV is then purified by methods known in the art including ion exchange chromatography (e.g. see U.S. Pat. Nos. 7,419,817 and 6,989,264), ion exchange chromatography and CsCl density centrifugation (e.g. PCT publication WO2011094198A10), immunoaffinity chromatography (e.g. WO2016128408) or purification using AVB Sepharose (e.g. GE Healthcare Life Sciences).

In many gene therapy applications, it is desirable that the gene therapy vector be delivered with a high degree of specificity to a particular tissue type. Accordingly, a viral vector can be modified to have specificity for a given cell type by expressing a ligand as a fusion protein with a viral coat protein on the outer surface of the virus. The ligand is chosen to have affinity for a receptor known to be present on the cell type of interest. For example, Han et al., *Proc. Natl. Acad. Sci. USA* 92:9747-9751 (1995), reported that Moloney mouse leukemia virus can be modified to express human heregulin fused to gp70, and the recombinant virus infects certain human breast cancer cells expressing human epidermal growth factor receptor. This principle can be extended to other virus-target cell pairs, in which the target cell expresses a receptor and the virus expresses a fusion protein comprising a ligand for the cell-surface receptor. For example, filamentous phage can be engineered to display antibody fragments (e.g., FAB or Fv) having specific binding affinity for virtually any chosen cellular receptor. Although the above description applies primarily to viral vectors, the same principles can be applied to nonviral vectors. Such vectors can be engineered to contain specific uptake sequences which favor uptake by specific target cells.

Gene therapy vectors can be delivered in vivo by administration to an individual patient, typically by systemic administration (e.g., intravenous, intraperitoneal, intramuscular, subdermal, or intracranial infusion, including direct injection into the brain) or topical application, as described below.

Pharmaceutically acceptable carriers are determined in part by the particular composition being administered, as well as by the particular method used to administer the composition. Accordingly, there is a wide variety of suitable formulations of pharmaceutical compositions available, as described below (see, e.g., *Remington's Pharmaceutical Sciences*, 17th ed., 1989).

The effective amount of expression cassette (and optional nuclease(s), and/or modified cells) to be administered will vary from patient to patient. Accordingly, effective amounts are best determined by the physician administering the compositions (e.g., cells) and appropriate dosages can be determined readily by one of ordinary skill in the art. Analysis of the serum, plasma or other tissue levels of the therapeutic polypeptide and comparison to the initial level prior to administration can determine whether the amount being administered is too low, within the right range or too high. Suitable regimes for initial and subsequent administrations are also variable, but are typified by an initial administration followed by subsequent administrations if necessary. Subsequent administrations may be administered at variable intervals, ranging from daily to annually to every several years. One of skill in the art will appreciate that appropriate immunosuppressive techniques may be recommended to avoid inhibition or blockage of transduction by immunosuppression of the delivery vectors, see e.g., Vilquin et al., (1995) *Human Gene Ther.*, 6:1391-1401.

Formulations for both ex vivo and in vivo administrations include suspensions (e.g., of genetically modified cells, liposomes or nanoparticles) in liquid or emulsified liquids.

The active ingredients often are mixed with excipients which are pharmaceutically acceptable and compatible with the active ingredient. Suitable excipients include, for example, water, saline, dextrose, glycerol, ethanol or the like, and combinations thereof. In addition, the composition may contain minor amounts of auxiliary substances, such as, wetting or emulsifying agents, pH buffering agents, stabilizing agents or other reagents that enhance the effectiveness of the pharmaceutical composition.

Applications

The methods and compositions disclosed herein are for providing therapies for any disease by provision of a transgene that expresses a product that is lacking or deficient in the disease or otherwise treats or prevents the disease.

EXAMPLES

Example 1: Clinical Methods

Quantitative PCR qRT-PCR (for human Factor VIII mRNA levels): RNA/DNA is isolated from plasma using AllPrep DNA/RNA kit per the manufacturer's instructions (Qiagen, Carlsbad CA). Extracted RNA is then used to make cDNA using Quantitect cDNA synthesis kit (Qiagen, Carlsbad CA). Quantitative PCR is then carried out using SsoAdvanced Universal Probes Supermix (Biorad, Hercules CA) on the Biorad CFX 96 using labelled primer/probe assays from IDT (Coralville IA). For the specific detection of human Factor VIII mRNA the primer/probe assay is custom; Forward primer (GGAGATGAAGAAGGAGGACTTTG) (SEQ ID NO:6), probe (ACATCTACGACGAGGACGAGAACCA) (SEQ ID NO:7) and Reverse primer (TCCACAGCAGCAAT-GAAGTAG) (SEQ ID NO:8). Quantitative qRT-PCR (not absolute) is used with normalization to GAPDH for each sample, and final data analyses is reported as relative to one sample which is set to 1.0. No template control and no reverse transcriptase controls are run with all samples and produce no detectable signal.

qPCR (for vector genome, VG, analyses): RNA/DNA is isolated from plasma using AllPrep DNA/RNA kit per the manufacturer's instructions (Qiagen, Carlsbad CA). Extracted DNA is used for quantitative PCR with TaqMan Fast Universal PCR Master Mix, No AmpErase UNG (Applied Biosystems, Foster City, CA) on the AB 7300 real-time PCR system (Applied Biosystems, Foster City, CA). For the specific detection of human Factor VIII the primer/probe assay is custom; forward primer (CCTGGGCC-AGTTCCTGCT) (SEQ ID NO:9), probe (TTCTGCCA-CATCAGCAGCCACCA) (SEQ ID NO:10) and reverse primer (GGCCTCCATGCCATCATG) (SEQ ID NO:11). No-template controls are run with all samples and produce no detectable signal. A qPCR DNA standard curve is generated from seven, serial 4-fold dilutions of a known amount of purified, linearized human Factor VIII plasmid.

Human FVIII total antigen immunoassay. Human Factor VIII B-Domain Deleted (hFVIII-BDD) total antigen in citrated human plasma is measured using an hFVIIIBDD immunoassay developed at Sangamo Therapeutics, Inc. Xyntha® (human recombinant BDD-FVIII) reference material will be used as the calibrator. Xyntha® will also be used as the QC to represent hFVIII-BDD antigen. The assay is a sandwich ELISA that uses a monoclonal antibody (mAb) as the capture antibody and a biotinylated mAb as the detection antibody, both of which have the A2 domain of the FVIII as the epitope. Following coating with the capture mAb (GMA-8023; Green Mountain Antibodies), blocking and washing, plasma samples, calibration and quality control samples at a minimal required dilution (MRD) of 5, are incubated in the assay plate, followed by washing. A biotinylated mAb (GMA-8024; Green Mountain Antibodies) is applied to the plate with incubation and subsequent washing before adding streptavidin-horse radish peroxidase (SA-HRP) conjugate reagent. After SA-HRP incubation and washing, the 3,3',5,5'-Tetramethylbenzidine (TMB) substrate solution is added for 10 minutes before adding an acidic stop solution to quench the reaction prior to detection at 450 run. Captured hFVIII-BDD antigen is quantified against a linear standard curve that is regressed using a log-log linear fit across a range of 0.020 IU/mL to 0.500 IU/mL. Calibrators will be prepared using a 10.0 IU/mL Xyntha® Working Solution prepared in pooled congenital FVIII-deficient plasma (George King Bio-Medical, or equivalent).

A 9-point calibration curve (range of quantitation from 0.500 IU/mL to 0.020 IU/mL with anchor points at 0.010 IU/mL and 0.000 IU/mL) is prepared using the assay calibrator diluted to the applicable levels in Assay Diluent. Calibration is performed as a single curve in duplicate using a log-log linear fitting with the total hFVIII-BDD antigen content measured in IU/mL on the x-axis, and the optical density (OD, measured at 450 nm) on they axis. The last two standard levels will be anchor points prepared at 0.010 IU/mL and 0.000 IU/mL, not having acceptance criteria. Samples and QCs are assayed in duplicate, and back-calculated against the calibration curve to determine total hFVIII-BDD antigen (concentration reported as IU/mL).

Chromogenic human Factor VIII Activity Assay. Activity of secreted human Factor VIII in plasma is determined using the Diapharma Chromogenic Coamatic Factor VIII assay (West Chester, OH) according to the manufacturer's protocol with the exception of the human Factor VIII standard. The human Factor VIII standard used in the ELISA assay is a recombinant purified human Factor VIII (#F0016-06) from US Biologicals (Salem, MA).

Clotting Activity Assay Activity of secreted human Factor VIII in plasma is determined using the activated partial thromboplastin time (aPTT) assay by Diagnostica Stago (Boston MA) according to the manufacturer's protocol with the exception of the human Factor VIII standard and human Factor VIII-deficient plasma. The human Factor VIII standard is the same as used in the ELISA assay (recombinant purified human Factor VIII, #F0016-06 from US Biologicals, Salem, MA). The deficient FVIII reagent used in the clotting assay is FVIII-CD<1% FVIII Activity (frozen deficient FVIII) from Haematologic Technologies, Inc. (Essex Junction, VT).

Example 2: Preparation of SB-525

The final product formulation base buffer, SBR-0099, comprised of phosphate buffered saline (PBS) containing $CaCl_2$, $MgCl_2$, 35 mM NaCl (i.e., 0.90 mM $CaCl_2$), 0.49 mM $MgCl_2$, 2.68 mM KCl, 1.47 mM $KH_2PO_4$, 172 mM NaCl, 8.10 mM $Na_2HPO_4$), was prepared using USP grade reagents. The SB-525 Bulk was adjusted to a target concentration of $1.0 \times 10^{13}$ vg/mL in final formulation buffer comprised of PBS containing $CaCl_2$), $MgCl_2$, 35 mM NaCl, 1% Sucrose, 0.05% Kolliphor (Poloxamer) P 188.

The SB-525 vector is an AAV vector comprising an AAV6 capsid and comprising SEQ ID NO:5 flanked 5' and 3' by AAV2 ITRs SEQ ID NOS: 12 and 13, respectively.

The SB-525 product was prepared by calculating the product component volume by multiplication of the dose level (vg/kg) by the subject's weight (kg) and then dividing by the viral genome concentration (vg/mL). The volume of normal saline (NS) was calculated to be at a 1:1 ratio of the SB-525 product. The total volume was calculated by adding together the volume of the NS plus the volume of the SB-525 product. Exemplary doses for the SB-525 product in subjects is shown below in Table I below:

TABLE I

Exemplary SB-525 Doses

| Dose level | Total SB-525 AAV Dose (vg/kg) |
|---|---|
| 1 | $6.00 \times 10^{11}$ |
| 2 | $9.00 \times 10^{11}$ |
| 3 | $1.20 \times 10^{12}$ |
| 4 | $2.00 \times 10^{12}$ |
| 5 | $4.00 \times 10^{12}$ |
| 6 | $6.00 \times 10^{12}$ |
| 7 | $1.00 \times 10^{13}$ |

Example 3: Infusion Protocol

Total volumes were expected to be between 4 mL and 200 mL, depending on subject's dose level assignment and body weight. If the total volume was less than 50 mL, then the infusion product was administered via syringe, while when the volume was greater than 50 mL, the infusion product was administered via infusion bag. Both infusion rates were at 100 mL/hour using a constant rate infusion pump.

Example 4: Study Objectives and Clinical Endpoints

Inclusion and exclusion criteria: For the study, the inclusion criteria included a subject being male and ≥18 years of age that had been treated or exposed to FVIII concentrates or cryoprecipitate for at least 150 exposure days. In addition, the subject needed to have ≥12 bleeding episodes over the preceding 12 months. Exclusion criteria included a subject having neutralizing antibodies against the AAV6 capsid, FVIII inhibitor or history of one, hypersensitivity to FVIII, evidence of any bleeding disorder in addition to Hemophilia A, markers of hepatic inflammation, and use of systemic (IV or oral) immunomodulatory agent.

Study objectives: The primary object of this study was to evaluate safety. This the primary objectives were to examine the safety and tolerability of SB-525 and evaluate the time-course profile of FVIII activity after dosing with SB-525. Secondary endpoints included observation in a change in baseline use of FVIII replacement therapy ("factor") and the frequency and severity in bleeding episodes, an evaluation of the clinical impact on the hemophilia A after dosing, and also evaluating the immune response to FVIII and vector shedding of the AAV2/6 vector. Exploratory objectives included evaluating the concurrence between FVIII levels by ELISA and FVIII activity assays and to evaluate any immune response to SB-525.

Approximately 20 subjects may be enrolled in this study. The dose selection and number of subjects studied at each dose level will be based on safety and the cumulative pharmacodynamic response (kinetics of circulating FVIII levels) observed in previously dosed subjects.

Approximately 7 dose levels may need to be studied to identify a safe and tolerable therapeutic range. Potential dose levels are $6 \times 10^{11}$, $9 \times 10^{11}$, $1.2 \times 10^{12}$, $2 \times 10^{12}$, $4 \times 10^{12}$, $6 \times 10^{12}$ and $1 \times 10^{13}$ vg/kg. The starting dose level ($9 \times 10^{11}$ vg/kg) is associated with FVIII activity of 12% of normal in a NHP study.

Example 5: Preliminary Results

Five patients were treated preliminarily. The SB-525 was found to generally well tolerated with no treatment-related serious adverse events and no use of steroid tapering. One patient treated in the third cohort (dose level 3) achieved expression of Factor VIII at a therapeutically relevant level that may be predictive of significant reduction or elimination of spontaneous bleeds and factor usage. In the second cohort (dose level 2), reduced factor usage has been observed following treatment.

Example 6: Eight Patients Treated with SB-525 Gene Therapy Showed Dose-Dependent Increases in FVIII Activity, with Two Patients Treated with the $3 \times 10^{13}$ vg/kg Dose Reaching Normal FVIII Levels The Phase 1/2 Alta study is an open-label, dose-ranging clinical trial designed to assess the safety and tolerability of SB-525 in up to 20 adult patients with severe hemophilia A. Data indicate that SB-525 was generally well-tolerated and demonstrated a dose-dependent increase in Factor VIII (FVIII) levels across the four dosage cohorts.

The data from the first eight patients with hemophilia A treated with SB-525 gene therapy are encouraging and demonstrate a dose-dependent relationship, evidence of sustained factor levels, and low variability in both within each patient and within each cohort.

The Phase 1/2 data include eight patients treated across four ascending dosage cohorts ($9 \times 10^{11}$ vg/kg, $2 \times 10^{12}$ vg/kg, $1 \times 10^{13}$ vg/kg and $3 \times 10^{13}$ vg/kg, with two patients per cohort). Patients demonstrated a dose-dependent increase in FVIII levels, achieving clinically relevant increases in FVIII activity in the higher dosage cohorts and normal FVIII levels in the $3 \times 10^{13}$ vg/kg dosage cohort (normal range: 50-150%). A dose-dependent reduction in the use of Factor VIII replacement therapy was also observed, with significant reductions observed in the higher dose cohorts. SB-525 was generally well-tolerated, with one patient (treated with the $3 \times 10^{13}$ vg/kg dose) reporting a treatment-related serious adverse event of hypotension and fever, which occurred following vector infusion and resolved with treatment within 24 hours of completion of vector infusion.

Patients in the study were not treated with prophylactic steroids. No treatment-related serious adverse events and no ALT elevations requiring more than seven days of corticosteroid treatment were observed in the first three cohorts. One patient in the fourth cohort experienced an ALT elevation (>1.5×ULN) at week four that required a tapering course of oral steroids. The patient did not have any associated loss of Factor VIII activity or ALT elevations 7 weeks following initiation of the steroid therapy. The same patient experienced a treatment-related infusion reaction but was discharged the subsequent day according to the protocol-specified timeline.

Figure 2:
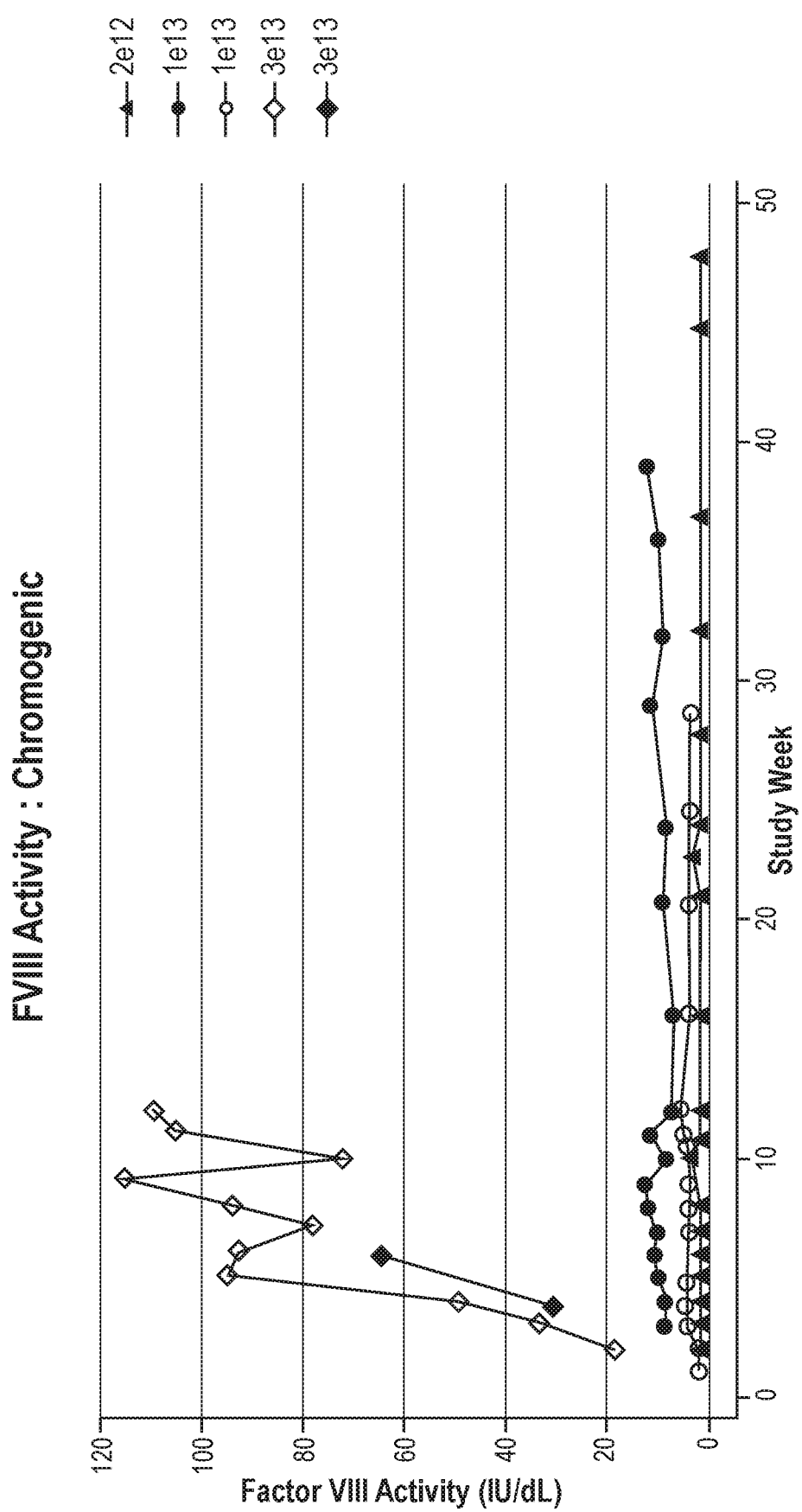
FIG. 2 shows FVIII activity data from Example 6 using a chromogenic assay as described in Example 1.
Figure 3:
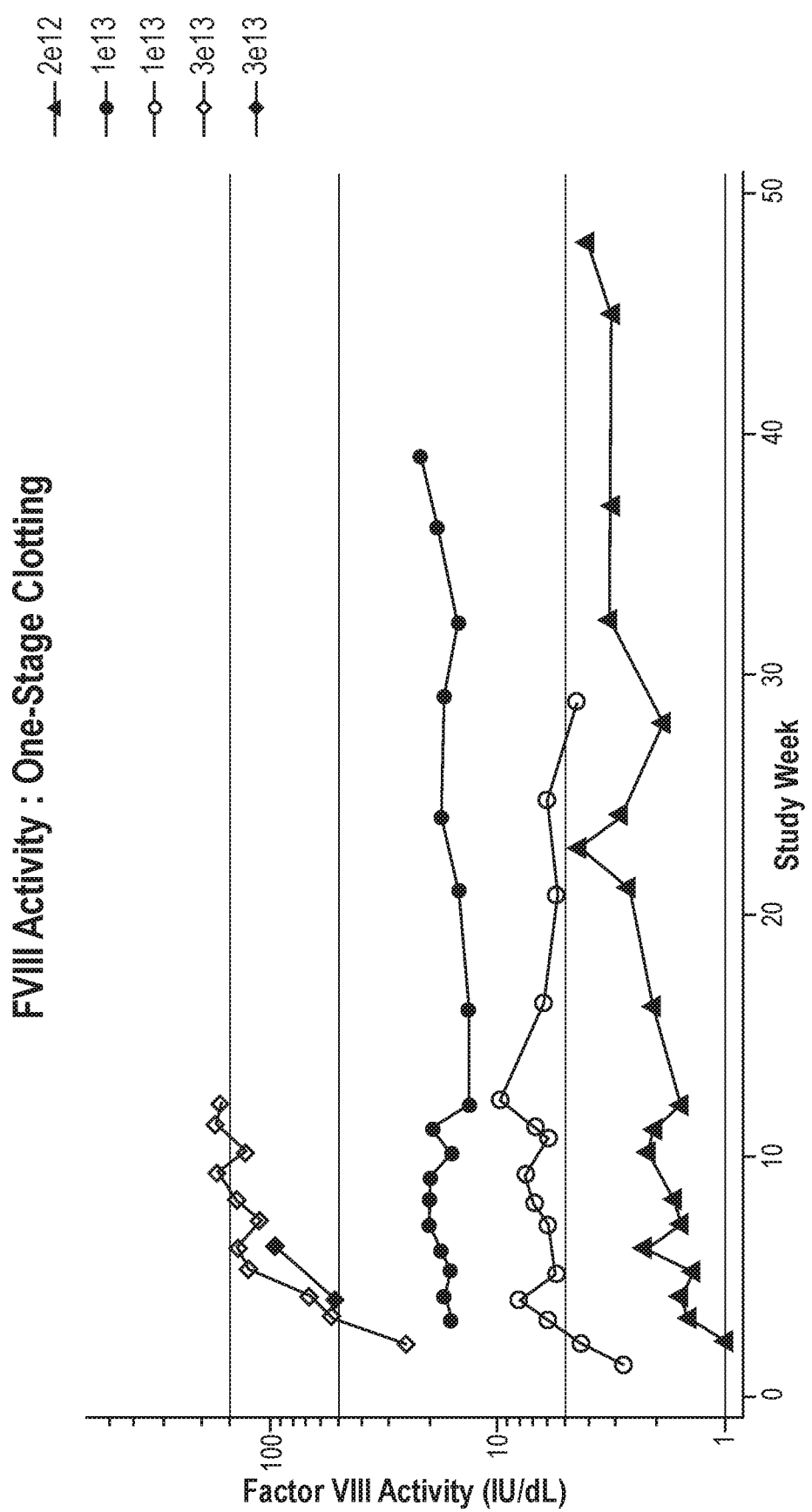
FIG. 3 shows FVIII activity data from Example 6 using a one-stage clotting assay as described in Example 1.

Table II provides data illustrating results of administration of dosages of AAV vector of $9 \times 10^{11}$, $2 \times 10^{12}$, $1 \times 10^{13}$ and $3 \times 10^{13}$ vg/Kg. FIGS. 1-3 provide FVIII activity data obtained post-administration.

TABLE II

Results of administration of dosages of AAV. "Follow-up" refers to the time period after administration at which FVIII activity levels (column 2) and the frequency of FVIII treatments (column 5) was measured.

| Dose of SB-525 (vg/kg) | FVIII activity levels (one-stage clotting assay) | Follow-up | Number of FVIII treatments before SB-525 injection | Number of FVIII treatments after SB-525 injection |
|---|---|---|---|---|
| $9 \times 10^{11}$ | <1%< | 52 weeks | 2-3/week | Prophylactic, week 12 |
| $9 \times 10^{11}$ | <1%< | 52 weeks | 2/week | Prophylactic, week 13 |
| $2 \times 10^{12}$ | <1%< | 52 weeks | 2-3/month | 9 in 12 months |
| $2 \times 10^{12}$ | 2-3% | 48 weeks | 3/week | 7 in 12 monhts |
| $1 \times 10^{13}$ | 13-20% | 40 weeks | 3/week | 7 in 36 weeks |
| $1 \times 10^{13}$ | 5-10% | 28 weeks | 1/3 weeks | 0 in 16 weeks |
| $3 \times 10^{13}$ | 115-172% | 12 weeks | 2/week | 0 in 12 weeks |
| $3 \times 10^{13}$ | 23-41% | 6 weeks | 3-4/week | Prophylactic in 1st 3 weeks |

Figure 4:
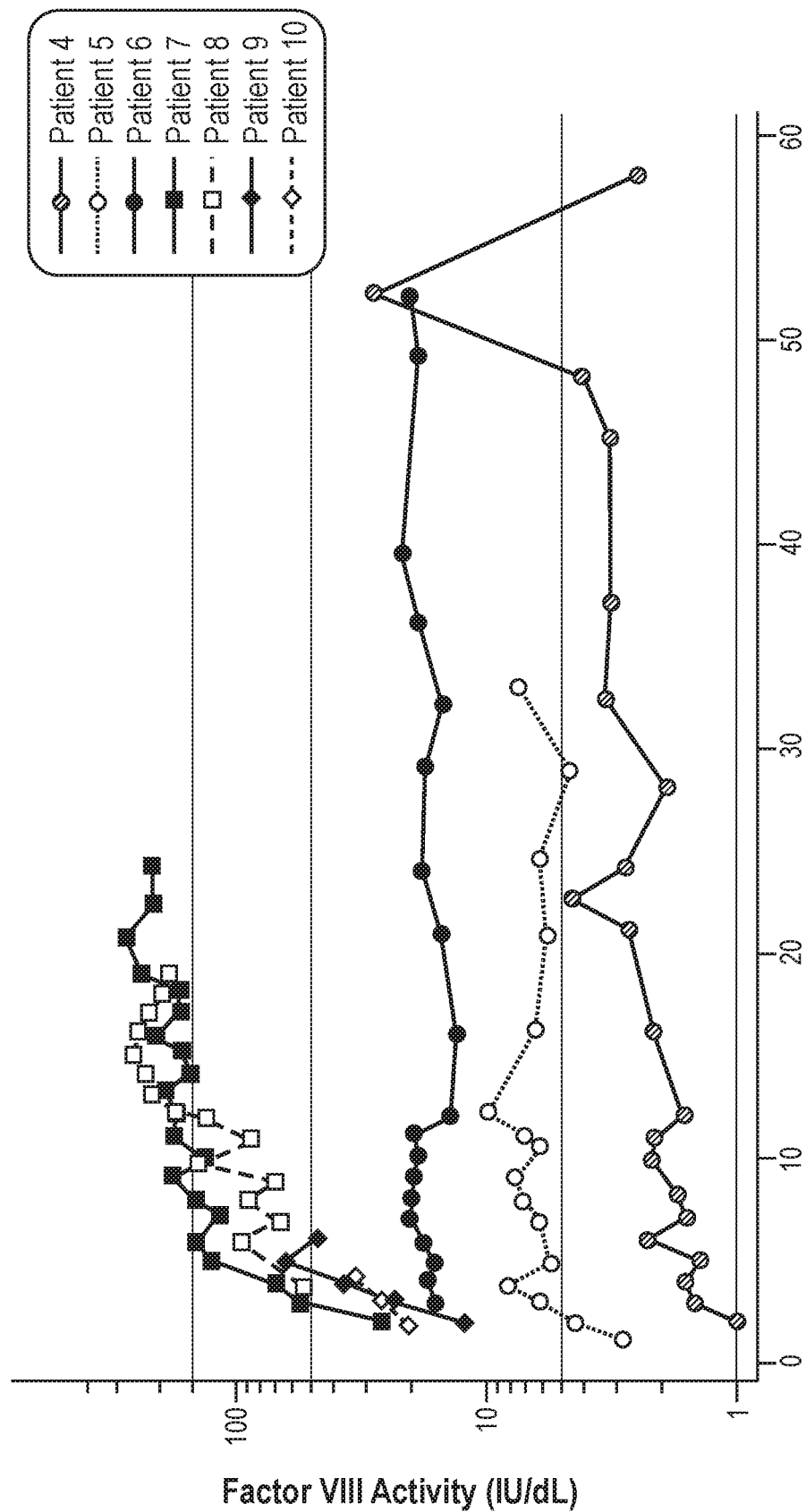
FIG. 4 shows FVIII activity based on a one-stage clotting assay as described in Example 1 in ten patients over time post-treatment with the vector.
Figure 5:
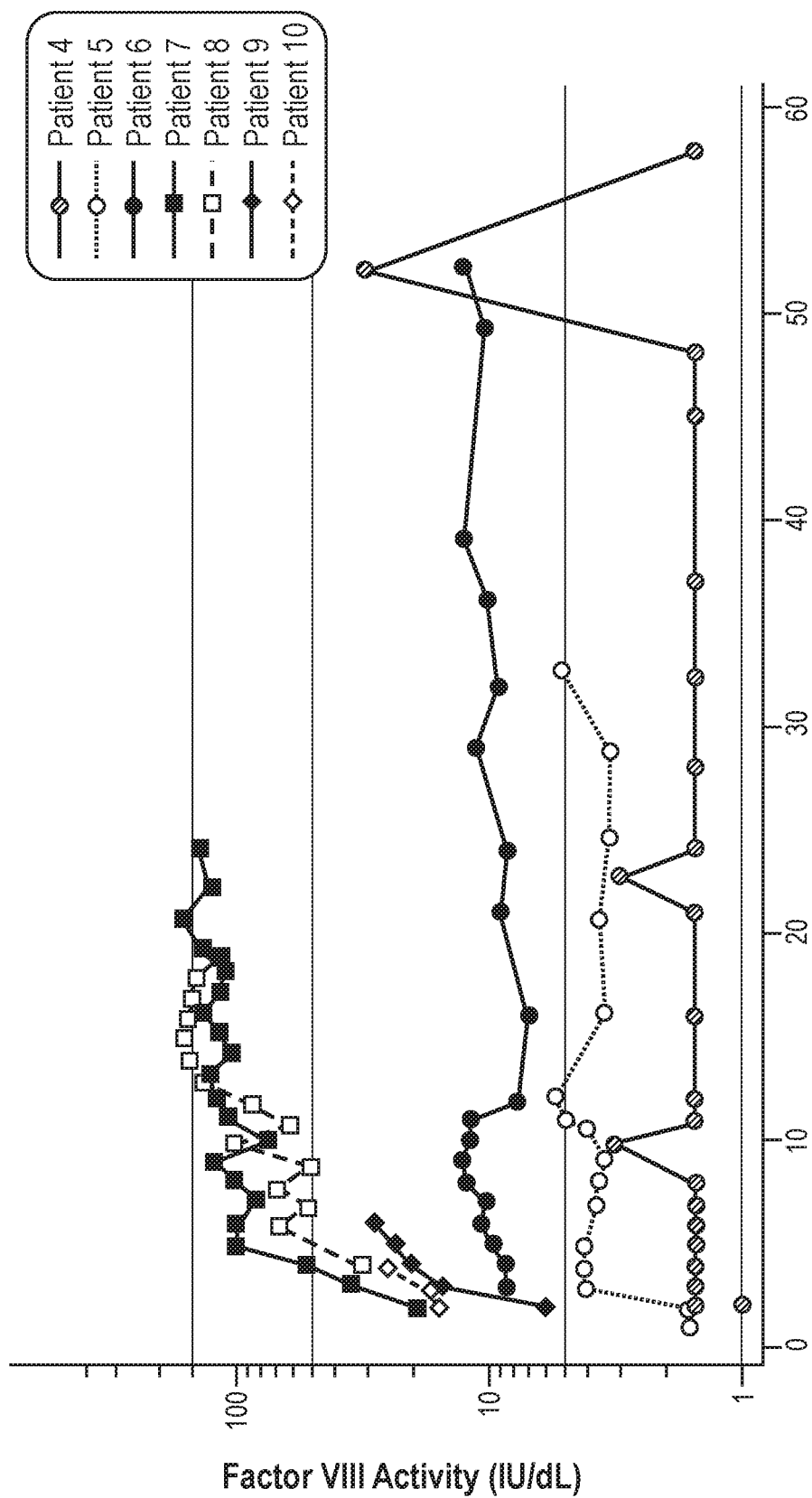
FIG. 5 shows FVIII activity based on a chromogenic assay as described in Example 1 in ten patients over time post-treatment with the vector.

Example 7: Ten Patients Treated with SB-525 Gene Therapy Showed Dose-Dependent Increases in FVIII Activity, with Four Patients Treated with the $3 \times 10^{13}$ vg/kg Dose Reaching Normal FVIII Levels The eight patients described in Example 6 were followed for more time and a further two patients (patients 9 and 10) were added to the trial at the $3 \times 10^{13}$ vg/kg dose. FIGS. 4 and 5 illustrate FVIII activity in all ten patients over time post treatment with the vector.

Figure 6:
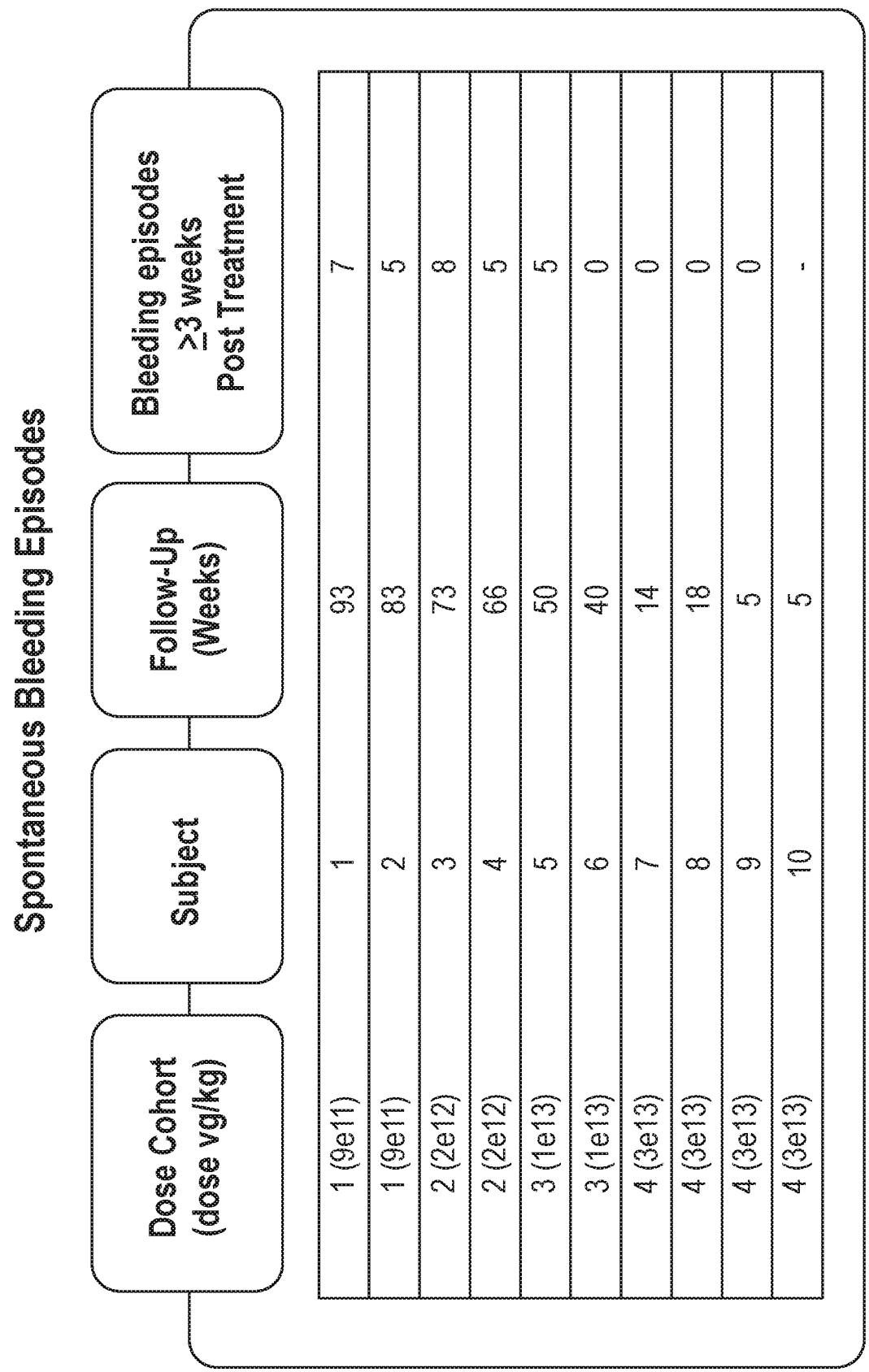
FIG. 6 shows data for spontaneous bleeding episodes of patients at least 3 weeks after vector administration at the dosage indicated.

As the dose escalates, spontaneous bleeding episodes disappear, and no bleeding episode was reported for any of the high dose patients. See, FIG. 6. FVIII usage, after a post-vector injection coverage of around 3 weeks, dropped to zero for one patient of cohort 3 ($1 \times 10^{13}$ vg/kg) and all patients of the high dose cohort ($3 \times 10^{13}$ vg/kg). Patient 9 had a last infusion at 3 weeks and 2 days, but no infusion since. See, FIG. 7 (asterisk signifying infusion occurred 2 days more than 3 weeks).

FIGS. 8-10 summarizes adverse event findings from the clinical trial.

All patents, patent applications and publications mentioned herein are hereby incorporated by reference in their entirety.

Although disclosure has been provided in some detail by way of illustration and example for the purposes of clarity of understanding, it will be apparent to those skilled in the art that various changes and modifications can be practiced without departing from the spirit or scope of the disclosure. Accordingly, the foregoing descriptions and examples should not be construed as limiting.

What is claimed is:

1. A method of increasing Factor VIII (FVIII) protein in a human subject, comprising intravenously administering to the human subject a dose of $1 \times 10^{13}$ to $5 \times 10^{13}$ vg/kg of an Adenovirus-Associated Virus serotype 6 (AAV6) vector that encodes a FVIII protein, wherein administration of the AAV6 vector results in a clinically relevant 20% to 172% increase in the level of circulating FVIII activity, and wherein the AAV6 vector comprises an expression cassette that comprises
a first insulator sequence comprising nucleotides 14-32 of SEQ ID NO:5,
an enhancer sequence of SEQ ID NO:2,
a promoter sequence of SEQ ID NO:3,
a coding sequence that encodes an FVIII protein of SEQ ID NO:1, and
a second insulator sequence comprising nucleotides 4869-4885 of SEQ ID NO:5.

2. The method of claim 1, wherein administration of the AAV6 vector results in one or zero occurrences of spontaneous bleeding episodes in the human subject between 3-12 months after administration.

3. The method of claim 1, comprising administering a dose of $1 \times 10^{13}$ vg/kg to $3 \times 10^{13}$ vg/kg of the AAV6 vector.

4. The method of claim 1, comprising administering a dose of $2 \times 10^{13}$ vg/kg to $4 \times 10^{13}$ vg/kg of the AAV6 vector.

5. The method of claim 1, comprising administering a dose of $3 \times 10^{13}$ vg/kg of the AAV6 vector.

6. The method of claim 1, wherein the clinically relevant increase is a 20% to 150% increase.

7. The method of claim 1, wherein the AAV6 vector comprises an AAV2 5' inverted terminal repeat (ITR) sequence and an AAV2 3' ITR sequence that flank the expression cassette.

8. The method of claim 7, wherein the AAV2 5' ITR comprises the nucleotide sequence of SEQ ID NO:12 and/or the AAV2 3' ITR comprises the nucleotide sequence of SEQ ID NO:13.

9. The method of claim 1, wherein the expression cassette comprises the nucleotide sequence of SEQ ID NO:5.

10. The method of claim 1, wherein the human subject has hemophilia.

11. A method of decreasing spontaneous bleeding episodes in a human subject receiving FVIII therapy, comprising intravenously administering to the human subject a dose of $1 \times 10^{13}$ to $5 \times 10^{13}$ vg/kg of an Adenovirus-Associated Virus serotype 6 (AAV6) vector that encodes a FVIII protein, wherein no more than one spontaneous bleeding episode occurs from 3 to 12 months after the intravenous administration, and wherein the AAV6 vector comprises an expression cassette that comprises
a first insulator sequence comprising nucleotides 14-32 of SEQ ID NO:5,
an enhancer sequence of SEQ ID NO:2,
a promoter sequence of SEQ ID NO:3,
a coding sequence that encodes an FVIII protein of SEQ ID NO:1, and
a second insulator sequence comprising nucleotides 4869-4885 of SEQ ID NO:5.

12. The method of claim 11, wherein the human subject does not receive any FVIII treatments 3-12 months after administration.

13. The method of claim 11, comprising administering a dose of $1 \times 10^{13}$ vg/kg to $3 \times 10^{13}$ vg/kg of the AAV6 vector.

14. The method of claim 11, comprising administering a dose of $2 \times 10^{13}$ vg/kg to $4 \times 10^{13}$ vg/kg of the AAV6 vector.

15. The method of claim 11, comprising administering a dose of $3 \times 10^{13}$ vg/kg of the AAV6 vector.

16. The method of claim 11, wherein the human subject does not receive any FVIII treatments 2, 5, or 10 years after administration.

17. The method of claim 11, wherein the AAV6 vector comprises an AAV2 5' ITR sequence and an AAV2 3' ITR sequence that flank the expression cassette.

18. The method of claim 17, wherein the AAV2 5' ITR comprises the nucleotide sequence of SEQ ID NO:12 and/or the AAV2 3' ITR comprises the nucleotide sequence of SEQ ID NO:13.

19. The method of claim 12, wherein the human subject has hemophilia and wherein the expression cassette comprises the nucleotide sequence of SEQ ID NO:5.

* * * * *